(12) United States Patent
Nishimura

(10) Patent No.: US 7,605,987 B2
(45) Date of Patent: Oct. 20, 2009

(54) ZOOM OPTICAL SYSTEM AND IMAGING APPARATUS INCORPORATING THE SAME

(75) Inventor: Kazuya Nishimura, Shibuya-ku (JP)

(73) Assignee: Olympus Imaging Corp., Tokyo (JP)

(*) Notice: Subject to any disclaimer, the term of this patent is extended or adjusted under 35 U.S.C. 154(b) by 75 days.

(21) Appl. No.: 11/985,735

(22) Filed: Nov. 16, 2007

(65) Prior Publication Data
US 2008/0259465 A1 Oct. 23, 2008

(30) Foreign Application Priority Data
Nov. 20, 2006 (JP) .............................. 2006-312474

(51) Int. Cl.
*G02B 15/14* (2006.01)
(52) U.S. Cl. .................................... 359/687
(58) Field of Classification Search .................. 359/687
See application file for complete search history.

(56) References Cited
U.S. PATENT DOCUMENTS
5,748,381 A * 5/1998 Ono .......................... 359/647

FOREIGN PATENT DOCUMENTS
JP 2004-94233 3/2004
JP 2005-181499 7/2005

\* cited by examiner

*Primary Examiner*—William C Choi
(74) *Attorney, Agent, or Firm*—Kenyon & Kenyon LLP

(57) ABSTRACT

The invention relates to a zoom optical system that, albeit having high zoom capabilities, has its total length reduced in consideration of size reductions upon received at a lens mount, and an imaging apparatus using the same. The zoom optical system comprises, in order from its object side, a positive first lens group, a negative second lens group, a positive third lens group and a positive fourth lens group. Upon zooming from the wide-angle end to the telephoto end, the second lens group moves in such a way as to lie more on the imaging plane side at the telephoto end than at the wide-angle end, and the third lens group moves. A lens component $L_{21}$ having negative refracting power is located in, and nearest to the object side of, the second lens group, and satisfies both condition (1) with respect to its shaping factor and condition (2) with respect to its focal length.

11 Claims, 18 Drawing Sheets

ZOOM OPTICAL SYSTEM AND IMAGING APPARATUS INCORPORATING THE SAME

This application claims benefit of Japanese Application No. 2006-312474 filed in Japan on Nov. 20, 2006, the contents of which are incorporated by this reference.

BACKGROUND OF THE INVENTION

The present invention relates generally to a zoom optical system and an imaging apparatus using the same, and more particularly to a zoom optical system that, albeit having high zoom capabilities, has its total length curtailed in consideration of size reductions upon received at a lens mount and an imaging apparatus incorporating the same.

In recent years, imaging apparatus using an electronic imaging device, like digital still cameras, have gained wide popularity. With the development and widespread of digital still cameras, there have been growing demands for image qualities, functions and sizes, and slimmed-down yet high-zoom-ratio zoom optical systems in particular are now in great demand.

Among optical systems having a zoom ratio of about 3, zoom optical systems comprising a first lens group of negative refracting power and a second and a third lens group of positive refracting power have been well known in the art. With an optical system having a negative group at the front, however, there is much difficulty in making sure brightness when it has a high zoom ratio especially on the telephoto side. Accordingly, an arrangement comprising a first lens group of positive power, a second lens group of negative power, a third lens group of positive power and a fourth lens group of positive power is often used for an optical system having a high zoom ratio.

Even with an optical system having a positive group at the front, however, its optical length is likely to get long as the zoom ratio grows high.

Size reductions of an optical system, too, are an important challenge for size reductions of imaging apparatus; it is important to curtail just only the total length of the optical system but also the total length of each lens group.

Some proposals have been put forward to meet such demands.

Patent Publication 1 discloses an optical system having a zoom ratio of about 5, showing in one example that the number of lenses is 9 with a reduction in the thickness of each lens group. However, the telephoto ratio at the telephoto end is 1.7 to 1.9: the maximum total length is still somewhat long.

On the other hand, Patent Publication 2 discloses an optical system having a zoom ratio of about 6.6, showing in several examples that the number of lenses is 9, and 10 with a reduction in the thickness of each lens group; further improvements in the zoom ratio and size are made while the telephoto ratio is kept at as low as about 1.5 with high zoom ratios.

With those prior arts, however, there is much to be desired in the total length because the telephoto ratio exceeds 1.5. For size reductions upon received at a lens mount, it is required to make group-to-group spaces narrower while just only the total length but also the amount of movement of each lens group is reduced.

Patent Publication 1
JP(A)2004-94233
Patent Publication 2
JP(A)2005-181499

SUMMARY OF THE INVENTION

In view of such problems with the prior art as described above, an object of the invention is to provide a zoom optical system that, albeit having high zoom capabilities, has its full length shortened in consideration of size reductions upon received at a lens mount, and an imaging apparatus.

According to one aspect of the invention, the aforesaid object is accomplishable by the provision of a zoom optical system comprising, in order from its object side, a positive first lens group, a negative second lens group, a positive third lens group and a positive fourth lens group wherein upon zooming from a wide-angle end to a telephoto end, the second lens group moves in such a way as to lie more on an image plane side at the telephoto end than at the wide-angle end and the third lens group moves, characterized in that a lens component $L_{21}$ having negative refracting power is located in, and nearest to an object side of, the second lens group, and satisfies the following conditions:

$$-1.0 < (R_{21f} + R_{21r})/(R_{21f} - R_{21r}) < 0.1 \quad (1)$$

$$1.5 < FL_{21}/F_2 < 6.0 \quad (2)$$

where $R_{21f}$ is the paraxial radius of curvature on the object side of the lens component $L_{21}$ having negative refracting power, $R_{21r}$ is the paraxial radius of curvature on the imaging plane side of the lens component $L_{21}$ having negative refracting power, $F_2$ is the focal length of the whole second lens group, and
$FL_{21}$ is the focal length of the lens component $L_{21}$ having negative refracting power.

According to another aspect of the invention, there is a zoom optical system provided, which comprises, in order from its object side, a positive first lens group, a negative second lens group, a positive third lens group and a positive fourth lens group wherein upon zooming from a wide-angle end to a telephoto end, the second lens group moves in such a way as to lie more on an imaging plane side at the telephoto end than at the wide-angle end and the third lens group moves, characterized in that a lens component $L_{21}$ having negative refracting power is located in, and nearest to an object side of, the second lens group, and satisfies the following conditions:

$$0.55 < IH < F_w \quad (3)$$

$$0.3 < F_1/F_t < 0.62 \quad (4)$$

$$-3.8 \leq F_1/F_2 < -2.0 \quad (5)$$

where IH is ½ of the diagonal size of the imaging plane,
$F_w$ is the focal length of the whole optical system at the wide-angle end,
$F_t$ is the focal length of the whole optical system at the telephoto end,
$F_1$ is the focal length of the whole first lens group, and
$F_2$ is the focal length of the whole second lens group.

The advantages of, and the requirements for, the aforesaid arrangements of the invention are now explained.

In the inventive zoom optical system, the positive first lens group, the negative second lens group, the positive third lens group and the positive fourth lens group are provided in order from its object side; upon zooming from the wide-angle end to the telephoto end, the second lens group moves in such a way as to lie more on the imaging plane side at the telephoto end than at the wide-angle end and the third lens group moves; and the second lens group has on its object side the lens component $L_{21}$ having negative refracting power.

When a three-group arrangement comprising, in order from its object side, a negative first, a positive second and a positive third lens group—often used with a small-format zoom optical system—is applied to an optical system having a high zoom ratio as it stands, it is likely to run short of brightness on the telephoto side with a likely increase in the amount of movement of the second lens group. Such an optical system must have a large aperture stop so as to make sure brightness on the telephoto side. It is also difficult to make sure optical performance because, to make the amount of movement of the second lens group smaller, it is required to make the refracting power stronger. On the other hand, there is an optical system comprising five or more lens groups; in consideration of size reductions of the optical system in general and size reductions of the optical system upon received at a lens mount in particular, however, this is detrimental to cost and productivity, because the driving mechanisms involved get complicated.

In the invention, the lens component $L_{21}$ located in, and nearest to its object side of, the second lens group is made up of a single lens with or without a resin applied to its surface, in which case the resin is by far too thin to maintain shape by itself.

Conditions (1) and (2) are the requirements for providing a small-format yet high-zoom-ratio optical system; they are the requirements for effectively reducing the size of the second lens group that has a zoom effect and a large volume.

In most cases, the negative lens component $L_{21}$ in the second lens group has its concave surface having a small radius of curvature directed to the imaging plane side. However, such a negative lens component is less likely to have good lens precision at its edge on lens processing, and grows thick on its own. By satisfying condition (1), it is then possible to effectively increase the refracting power of the second lens group that has a substantial zooming role. As already noted, the lens component $L_{21}$ is a single lens or a lens comprising a single lens with a thin resin applied to its one surface.

As the upper limit of 0.1 to condition (1) is exceeded, the radius of curvature of the imaging plane side of the negative lens component becomes small and its processing capabilities get worse. In addition, it is difficult to correct wide angle-side coma and astigmatism that occur on the imaging plane side, failing to make sure optical performance. As the lower limit of −1.0 to condition (1) is not reached, negative distortion on the wide-angle side turns up largely.

As the lower limit of 1.5 to condition (2) is not reached, the refracting power of the negative lens component $L_{21}$ becomes too strong to make correction of field curvature on the wide-angle side. As the upper limit of 6.0 is exceeded, the refracting power of the negative lens component $L_{21}$ becomes too small to lower the ray height of off-axis light rays with the result that the volume of the second lens group cannot be reduced.

According to the second aspect of the invention, the zoom optical system comprises, in order from its object side, a positive first lens group, a negative second lens group, a positive third lens group and a positive fourth lens group; upon zooming from the wide-angle end to the telephoto end, the second lens group moves in such a way as to lie more on the imaging plane side at the telephoto end than at the wide-angle end and the third lens group moves; and the lens component $L_{21}$ having negative refracting power is located in, and nearest to the object side of, the second lens group. Conditions (3), (4) and (5) here are the requirements for providing a small-format yet high-zoom-ratio optical system suitable for a combined lens and imaging apparatus.

As the lower limit of 0.55 to condition (3) is not reached, the optical system has a narrowing angle of view on the wide-angle side: it hardly provides a small-format imaging apparatus such as a combined lens and digital camera.

As the upper limit of 0.62 to condition (4) is exceeded, the total length of the optical system becomes long, and as the lower limit of 0.3 is not reached, the refracting power of the first lens group becomes too strong to make sure axial optical performance on the telephoto side.

As the lower limit of −3.8 to condition (5) is not reached, it causes the entrance pupil to be located deep and the diameter of lenses in the first lens group to become large, resulting in added weight and a larger lens barrel. As the upper limit of −2.0 to condition (5) is exceeded, it causes aberration fluctuations to grow large in association with zooming, and makes it difficult to achieve high zoom capabilities.

For the lens component $L_{21}$ having negative refracting power, it is preferable that the vitreous material of at least one surface or a surface with a thin resin applied to it is subjected to aspheric processing.

In the second lens group, an aspheric surface is expected to make improvements in off-axis aberrations because there are light rays split depending on an image height. For a lens having a smaller radius of curvature on the imaging plane side, however, it is difficult to fabricate an aspheric lens.

Therefore, it is desired that the surface of the vitreous material or a surface with a thin resin applied to it be subjected to aspheric processing.

For the aforesaid negative second lens group, it is preferable to comprise, in order from its object side, a lens component $L_{21}$ having negative refracting power, a lens component $L_{22}$ having negative refracting power and a lens component $L_{23}$ having positive refracting power.

In a zoom optical system with the positive lens group at the front wherein the first lens group is positive, the second lens group is negative, the third lens group is positive and the fourth lens group is positive, if the second lens group having the greatest load on zooming is made up of one negative lens, not only does its refracting power grow large, producing large field curvature on the wide-angle side, but also its radius of curvature becomes small; in other words, its normal angle grows large near an effective diameter, resulting in poor processing capabilities.

For the reason as described above, the second lens group here is made up of, in order from its object side, the lens component $L_{21}$ having negative refracting power, the lens component $L_{22}$ having positive refracting power and the lens component $L_{23}$ having positive refracting power, three in all, so that field curvature is minimized on the wide-angle side in particular, and the radius of curvature is prevented from getting small.

Further, if conditions (1) and (2) are satisfied with respect to the refracting power of the lens component $L_{21}$ having negative refracting power, it is then possible to lower the height of light rays while making effective correction of off-axis aberrations, and intensify the refracting power of the whole second lens group while diminishing its volume.

The aforesaid lens component $L_{21}$ having negative refracting power, and the aforesaid lens component $L_{22}$ having negative refracting power should satisfy the following condition:

$$1.8 < FL_{21}/FL_{22} < 3.0 \tag{6}$$

where $FL_{21}$ is the focal length of the lens component $L_{21}$ having negative refracting power, and $FL_{22}$ is the focal length of the lens components $L_{22}$ having negative refracting power.

Condition (6) is the requirement for effectively enhancing the refracting power of the second lens group having a substantial effect on zooming, thereby providing an optical system that is of small format yet has a relatively high zoom ratio. To have a high zoom ratio, the second lens group must have a strong refracting power; however, higher-order off-axis aberrations are then likely to occur on the wide-angle side. By satisfying condition (6), it is possible to effectively enhance the refracting power of the second lens group. As the lower limit of 1.8 to condition (6) is not reached, it causes the refracting power of the lens component $L_{21}$ to grow strong, making correction of astigmatism on the wide-angle side difficult, and as the upper limit of 3.0 to condition (6) is exceeded, it causes the entrance pupil on the wide-angle side to be located far, resulting in an increase in the diameter of the lenses in the first lens group.

It is also desired that the aforesaid third lens group moves in unison with the aperture stop.

In a zoom optical system incorporated in a small-format imaging apparatus, the integral driving of the aperture stop and the third lens group is more simplified in the mechanism involved than the independent movement or fixation of the aperture stop mechanism.

According to the third aspect of the invention, there is a zoom optical system provided, which comprises, in order from its object side, a positive first lens group, a negative second lens group, a positive third lens group and a positive fourth lens group wherein upon zooming from a wide-angle end to a telephoto end, the first lens group moves in such a way as to lie more on the object side at the telephoto end than at the wide-angle end, the second lens group moves in such a way as to lie more on an imaging plane side at the telephoto end than at the wide-angle end, and the third lens group moves, characterized in that the second lens group comprises, in order from its object side, a lens component $L_{21}$ having negative refracting power, a lens component $L_{22}$ having negative refracting power and a lens component $L_{23}$ having positive refracting power, and the lens component $L_{21}$ and the lens component $L_{22}$ satisfy the following condition:

$$1.8 < FL_{21}/FL_{22} < 6.0 \tag{6'}$$

where $FL_{21}$ is the focal length of the lens component $L_{21}$ having negative refracting power, and $FL_{22}$ is the focal length of the lens component $L_{22}$ having negative refracting power.

In the zoom optical system according to the third aspect of the invention, the positive first lens group, the negative second lens group, the positive third lens group and the positive fourth lens group are provided in order from its object side; upon zooming from the wide-angle end to the telephoto end, the second lens group moves in such a way as to lie more on the imaging plane side at the telephoto end than at the wide-angle end and the third lens group moves; and the second lens group comprises, in order from its object side, the lens component $L_{21}$ having negative refracting power, the lens component $L_{22}$ having negative refracting power and the lens component $L_{23}$ having positive refracting power. Condition (6)' here is the requirement for effectively enhancing the refracting power of the second lens group having a substantial effect on zooming, thereby providing an optical system that is of small format yet has a relatively high zoom ratio. To have a high zoom ratio, the second lens group must have a strong refracting power; however, higher-order off-axis aberrations are then likely to occur on the wide-angle side. By satisfying condition (6)', it is possible to effectively enhance the refracting power of the second lens group. As the lower limit of 1.8 to condition (6)' is not reached, it causes the refracting power of the lens component $L_{21}$ to grow strong, making correction of astigmatism on the wide-angle side difficult, and as the upper limit of 6.0 to condition (6)' is exceeded, it causes the entrance pupil on the wide-angle side to be located far, resulting in an increase in the diameter of the lenses in the first lens group.

In this case, it is preferable for the aforesaid lens component $L_{21}$ having negative refracting power to satisfy the following condition:

$$-1.0 < (R_{21f} + R_{21r})/(R_{21f} - R_{21r}) < 0.1 \tag{1}$$

where $R_{21f}$ is the paraxial radius of curvature on the object side of the lens component $L_{21}$ having negative refracting power, $R_{21r}$ is the paraxial radius of curvature on the imaging plane side of the lens component $L_{21}$ having negative refracting power, $F_2$ is the focal length of the whole second lens group, and $FL_{21}$ is the focal length of the lens component $L_{21}$ having negative refracting power.

In most cases, the negative lens component $L_{21}$ in the second lens group has its concave surface having a small radius of curvature directed to the imaging plane side. However, such a negative lens component is less likely to have good lens precision at its edge on lens processing, and grows thick on its own. As already noted, the lens component $L_{21}$ is a single lens or a lens comprising a single lens with a thin resin applied to its one surface.

As the upper limit of 0.1 to condition (1) is exceeded, the radius of curvature of the imaging plane side of the negative lens component becomes small and its processing capabilities get worse. In addition, it is difficult to correct wide angle-side coma and astigmatism that occur on the imaging plane side, failing to make sure optical performance. As the lower limit of −1.0 to condition (1) is not reached, negative distortion on the wide-angle side turns up largely.

For the aforesaid lens component $L_{21}$ having negative refracting power, it is preferable to have an aspheric surface at least at its object-side surface.

Given lens configuration satisfying conditions (6)' and (1), aspheric processing is easily achievable because the local normal angle of the surface is small, cutting back on the material cost involved.

Preferably for any one of the aforesaid zoom optical systems, focusing is implemented with the positive fourth lens group and the following condition is satisfied:

$$0.6 < MG_{t4} < 0.85 \tag{7}$$

where $MG_{t4}$ is the transverse magnification of the fourth lens group at the telephoto end.

The fourth lens group, because of its light weight, lends itself to a focusing mechanism. For focusing, the fourth lens group must be free from the magnification change of 1. When there is none of the magnification change of 1, too, the amount of movement of the fourth lens group increases upon focusing at a near distance as it gets closer to 1. As the upper limit of 0.85 to condition (7) is exceeded, the amount of movement of the fourth lens group upon focusing increases and the focusing mechanism gets bulky, rendering closest-range shooting difficult. As the lower limit of 0.6 to condition (7) is not reached, the amount of movement upon focusing decreases, but it is required to increase the combined focal length of lens groups located on the object side with respect to the focusing group; to make sure performance, the optical system must have a lot longer total length.

Preferably in this case, the aforesaid positive fourth lens group should be a single aspheric lens made of a plastic material.

Although a plastic lens is inferior to a glass lens in terms of temperature and humidity properties, surface hardness, etc., yet it is much superior in terms of mass productivity, weight, and cost. Further, the plastic material can be processed into an aspheric lens at much lower costs than could be achieved with glass materials. In addition, if the focusing group is built up of a plastic lens having a lower specific weight, loads on the driving mechanism can then be relieved off.

It is also desirous that the lens component $L_{21}$ that is located in, and nearest to the object side of, the aforesaid second lens group is formed of a plastic material, and has an aspheric surface.

Although the plastic lens is inferior to a glass lens in terms of temperature and humidity properties, surface hardness, etc., yet it is much superior in terms of mass productivity, weight, and cost. Further, the plastic material can be processed into an aspheric lens at much lower costs than could be achieved with glass materials.

Further, for the lens component $L_{23}$ located in the aforesaid second lens group and having positive refracting power it is preferable to satisfy the following condition:

$$-1.2 < (R_{23f} + R_{23r})/(R_{23f} - R_{23r}) < 0 \quad (8)$$

where $R_{23f}$ is the paraxial radius of curvature on the object side of the lens component $L_{23}$ having positive refracting power, and $R_{23r}$ is the paraxial radius of curvature on the imaging plane side of the lens component $L_{23}$ having positive refracting power.

Condition (8) is the requirement for making well-balanced correction of lower- and higher-order aberrations of astigmatism on the wide-angle side. As the lower limit of −1.2 to condition (8) is not reached, the image plane is likely to tilt down on the object side, and as the upper limit of 0 is exceeded, it is likely to tilt down in the opposite direction to the object side.

The invention also includes an imaging apparatus comprising any one of the aforesaid zoom optical systems and an imaging device that is located on the image side of that zoom optical system for converting an optical image into electric signals.

Preferably in this case, between the zoom optical system and the imaging device there is a low-pass filter located.

According to the invention as described above, it is possible to provide a zoom optical system that, albeit having high zoom capabilities, has its total length curtailed in consideration of size reductions upon received at a lens mount, and an imaging apparatus incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The zoom lens (zoom optical system) of the invention is now explained with reference to Examples 1 to 7. FIGS. 1 to 7 are illustrative in lens arrangement section of Examples 1 to 7 at the wide-angle ends (a), in the intermediate states (b) and at the telephoto ends (c) upon focusing on an object point at infinity. Throughout FIGS. 1 to 7, G1 stands for the first lens group; G2 the second lens group; S an aperture stop; G3 the third lens group; G4 the fourth lens group; F a plane-parallel plate that forms a low-pass filter with an IR cut coating applied on it, etc.; C a plane-parallel plate for the cover glass of an electronic imaging apparatus (CCD or C-MOS); and I an image plane (the light reception plane of the electronic imaging apparatus). Note here that the cover glass G may be coated on its surface with a wavelength-limiting multilayer coating, and that that cover glass G may have a low-pass filter action.

EXAMPLE 1

Figure 1A:
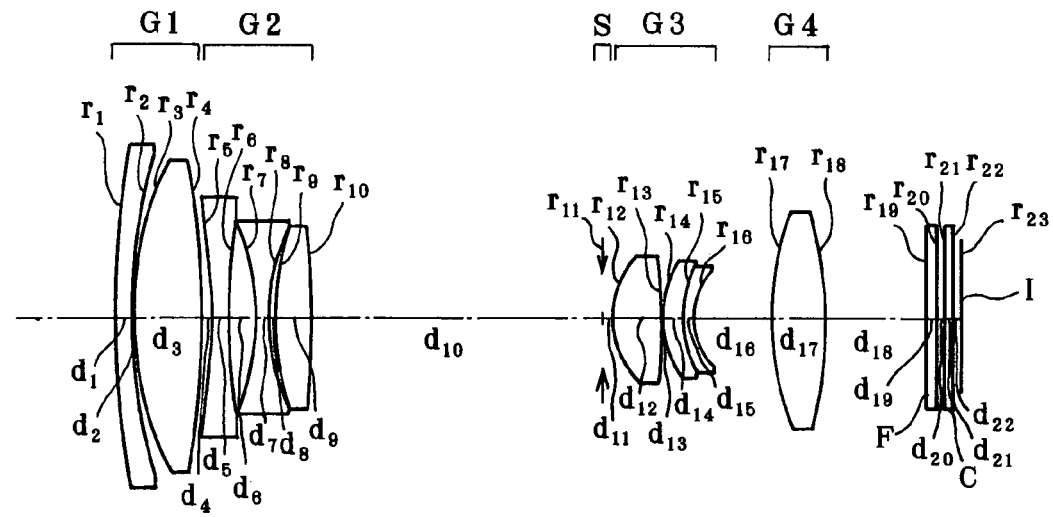
FIG. 1 is illustrative in lens arrangement section of Example 1 of the inventive zoom optical system at the wide-angle end (a), in the intermediate state (b) and at the telephoto end (c) upon focusing on an object point at infinity.
Figure 1B:
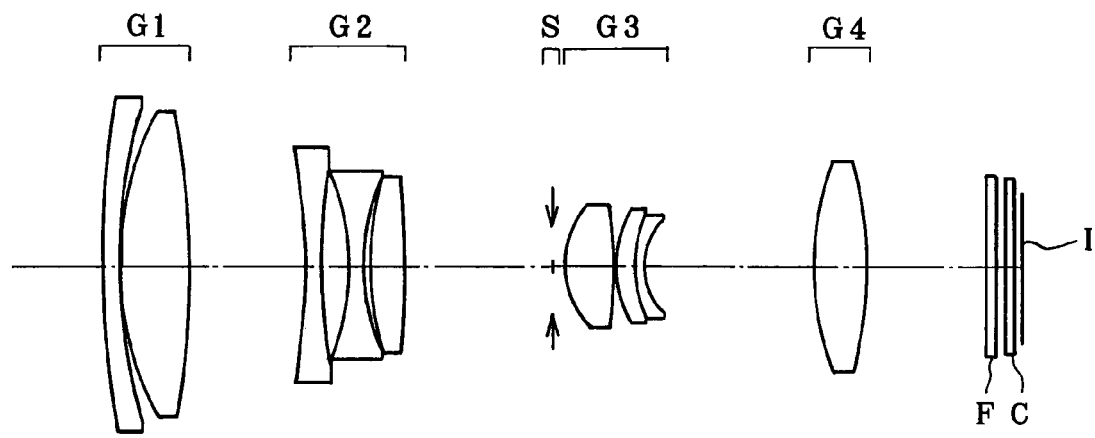
Figure 1C:
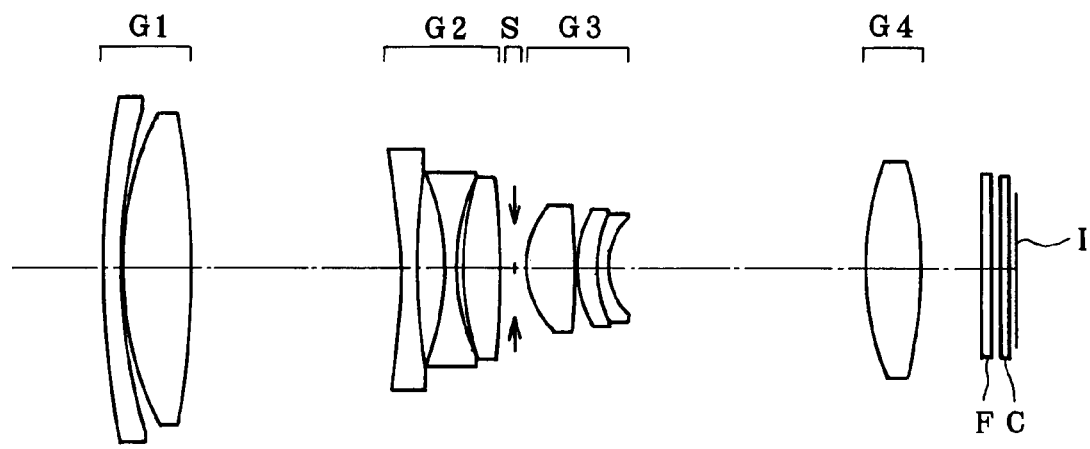

As shown in FIG. 1, Example 1 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves on a convex locus toward the object side and is positioned more on the object side at the telephoto end than at the wide-angle end. The second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Five aspheric surfaces are used: one at the image-side surface of the double-convex positive lens in the first lens group G1, one at the object-side surface of double-concave negative lens in, and on the object side of, the second lens group G2, two at both surfaces of the double-convex positive lens in the third lens group G3, and one at the object-side surface of the double-convex positive lens in the fourth lens group G4.

EXAMPLE 2

Figure 2A:
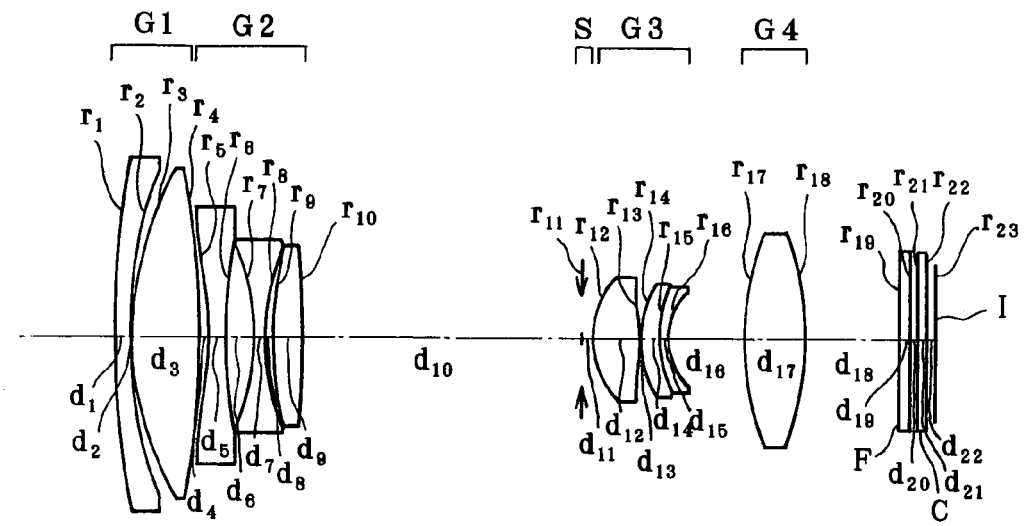
FIG. 2 is illustrative, as in FIG. 1, of Example 2 of the inventive zoom optical system.
Figure 2B:
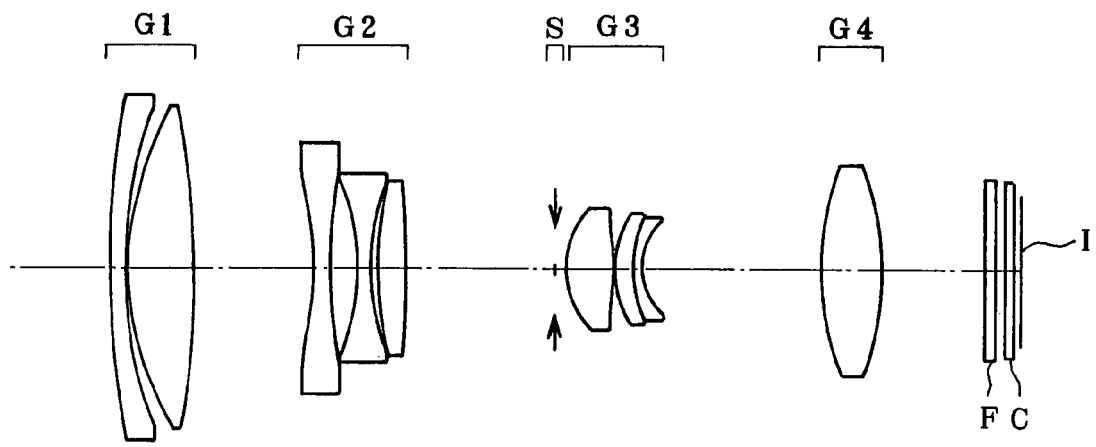
Figure 2C:
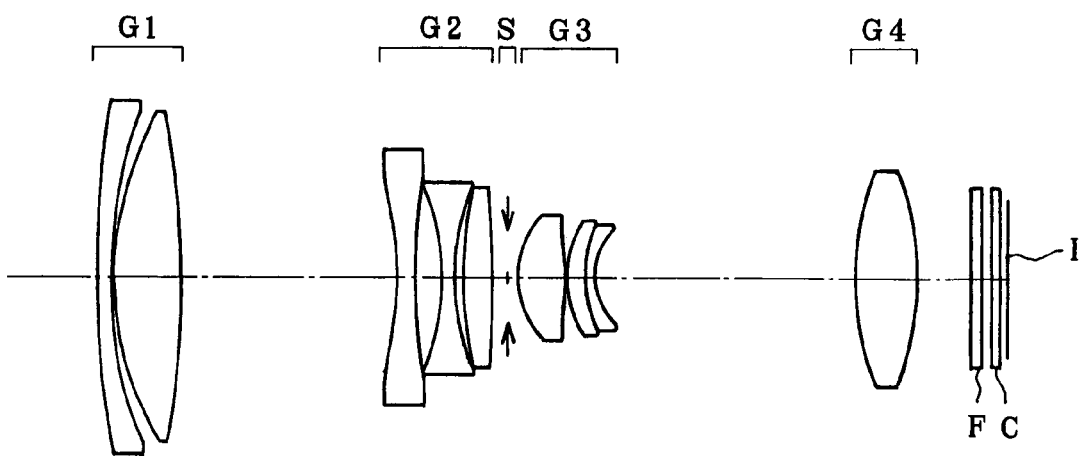

As shown in FIG. 2, Example 2 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves on a convex locus toward the object side and is positioned more on the object side at the telephoto end than at the wide-angle end. The second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Five aspheric surfaces are used: one at the image-side surface of the double-convex positive lens in the first lens group G1, one at the object-side surface of double-concave negative lens in, and on the object side of, the second lens group G2, two at both surfaces of the double-convex positive lens in the third lens group G3, and one at the object-side surface of the double-convex positive lens in the fourth lens group G4.

Note here that the double-concave negative lens in, and on the object side of, the second lens group G2, and the double-convex positive lens in the fourth lens group G4 is formed of plastics.

EXAMPLE 3

Figure 3A:
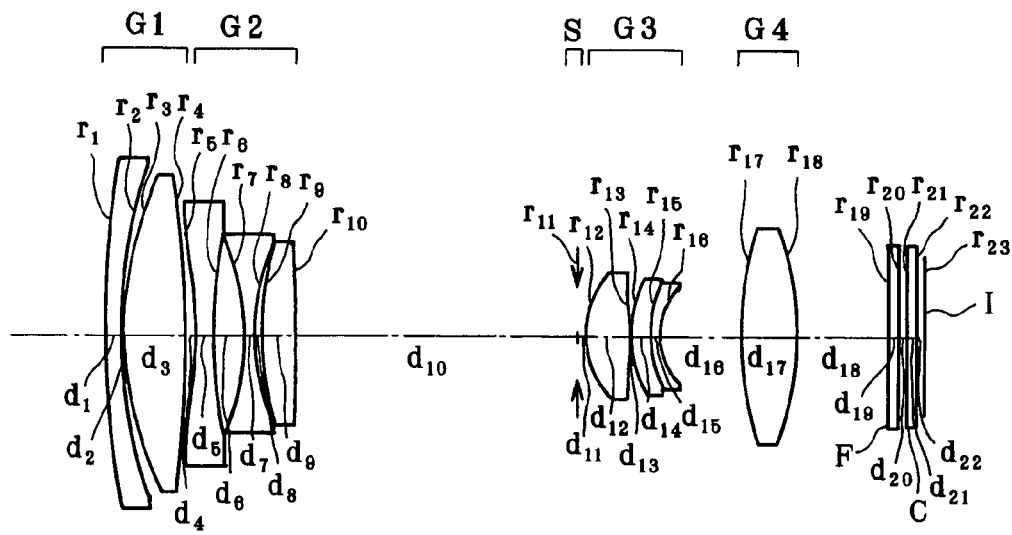
FIG. 3 is illustrative, as in FIG. 1, of Example 3 of the inventive zoom optical system.
Figure 3B:
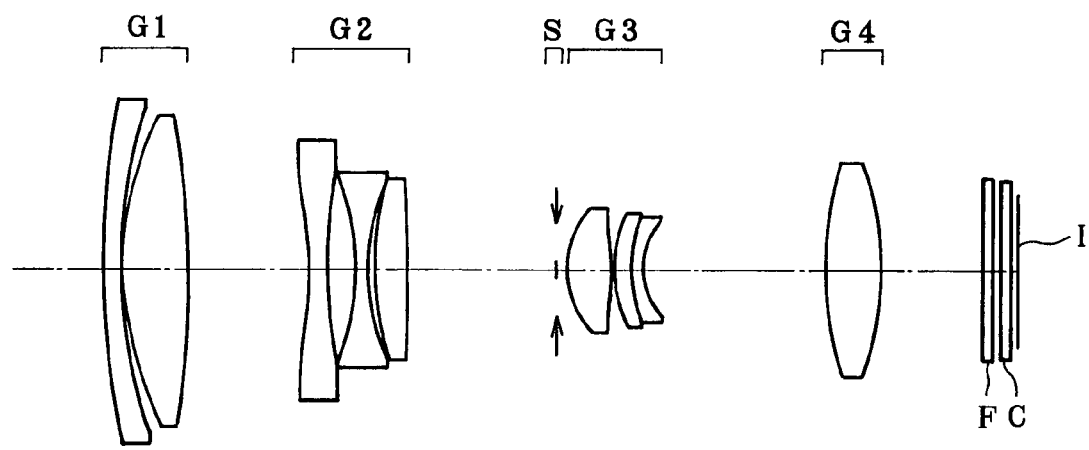
Figure 3C:
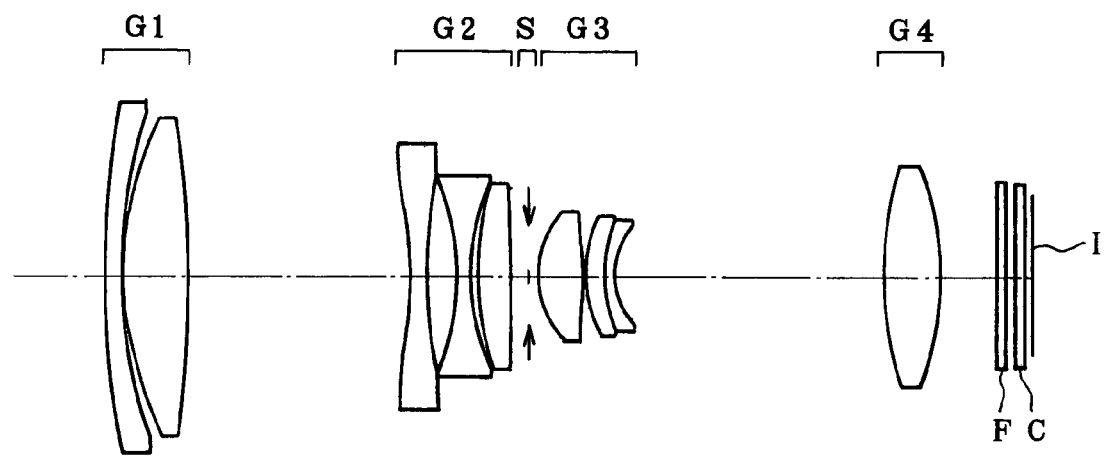

As shown in FIG. 3, Example 3 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves toward the object side, and the second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Five aspheric surfaces are used: one at the image-side surface of the double-convex positive lens in the first lens group G1, one at the object-side surface of double-concave negative lens in, and on the object side of, the second lens group G2, two at both surfaces of the double-convex positive lens in the third lens group G3, and one at the object-side surface of the double-convex positive lens in the fourth lens group G4.

Note here that the double-concave negative lens in, and on the object side of, the second lens group G2, and the double-convex positive lens in the fourth lens group G4 is formed of plastics.

EXAMPLE 4

Figure 4A:
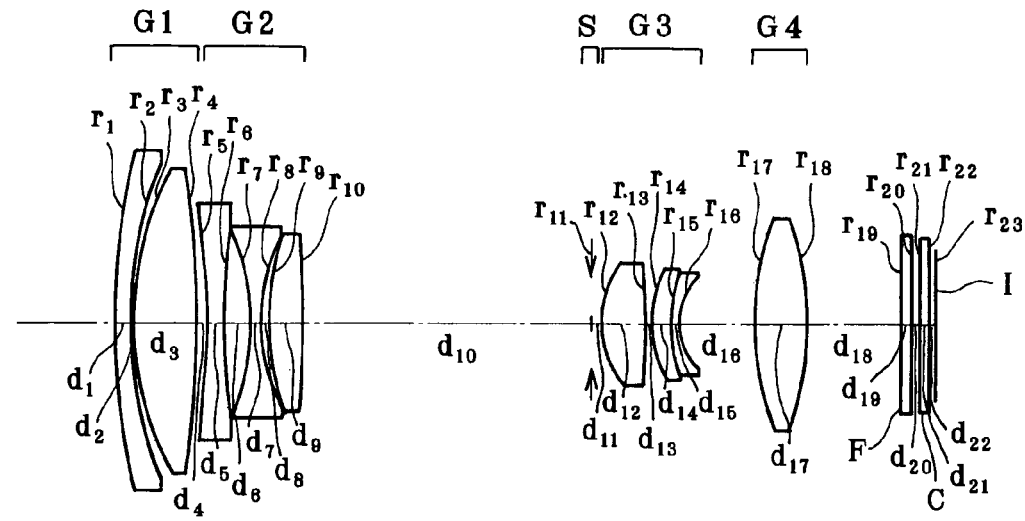
FIG. 4 is illustrative, as in FIG. 1, of Example 4 of the inventive zoom optical system.
Figure 4B:
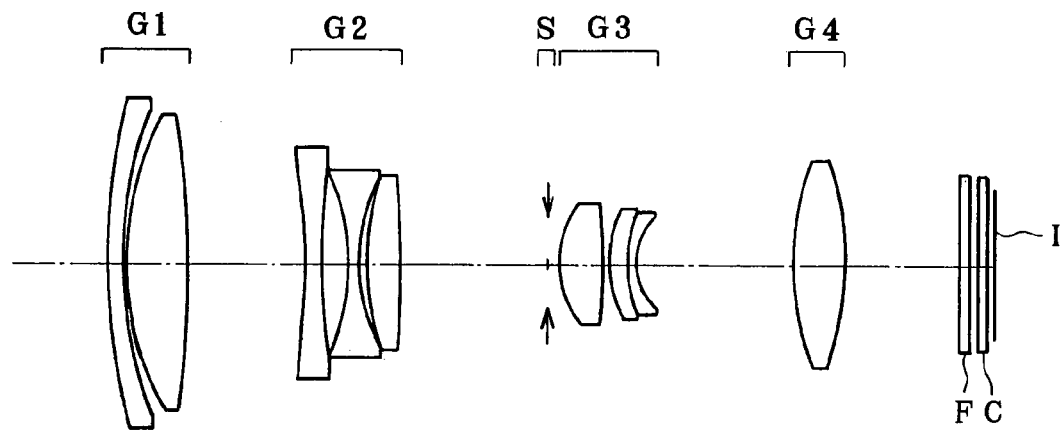
Figure 4C:
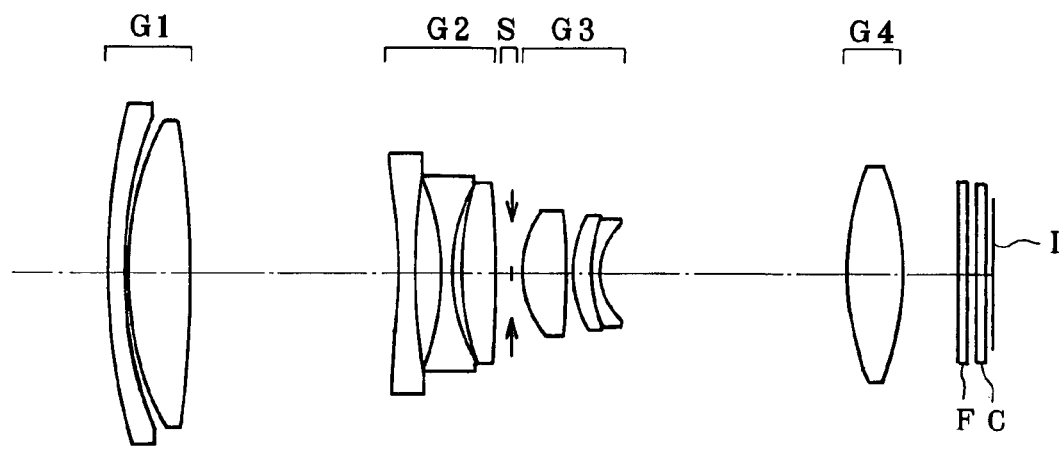

As shown in FIG. 4, Example 4 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves on a convex locus toward the object side and is positioned more on the object side at the telephoto end than at the wide-angle end. The second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Five aspheric surfaces are used: one at the image-side surface of the double-convex positive lens in the first lens group G1, one at the object-side surface of double-concave negative lens in, and on the object side of, the second lens group G2, two at both surfaces of the double-convex positive lens in the third lens group G3, and one at the object-side surface of the double-convex positive lens in the fourth lens group G4.

Note here that the double-convex positive lens in the fourth lens group G4 is formed of plastics.

EXAMPLE 5

Figure 5A:
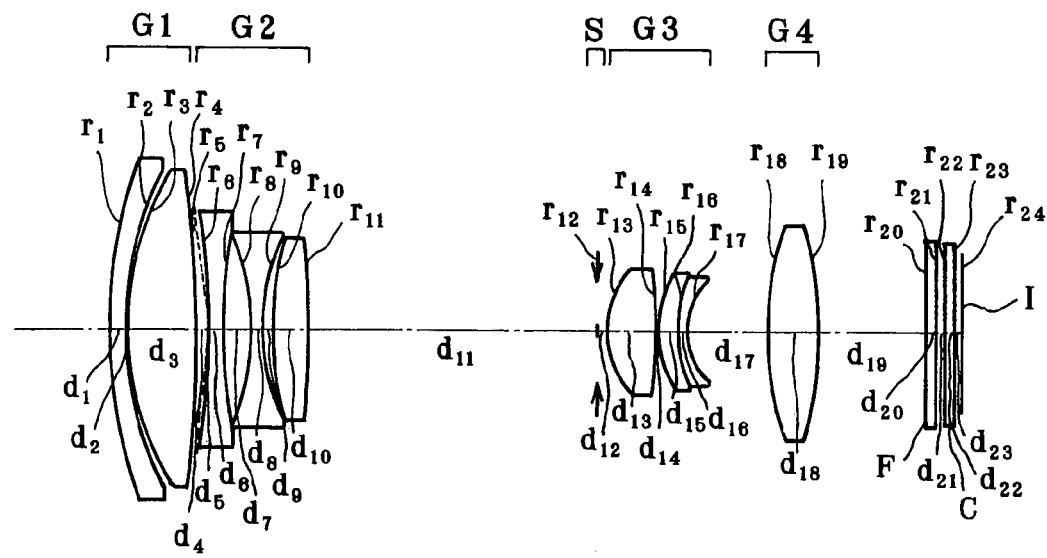
FIG. 5 is illustrative, as in FIG. 1, of Example 5 of the inventive zoom optical system.
Figure 5B:
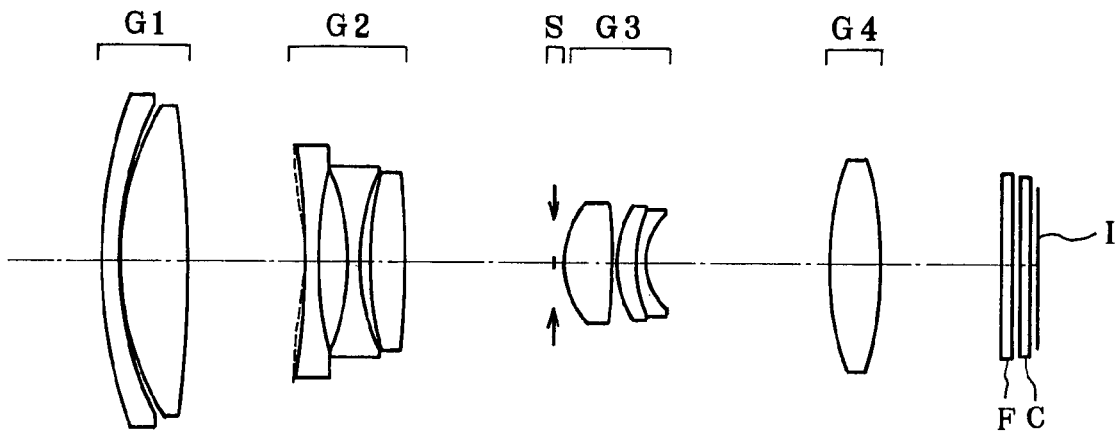
Figure 5C:
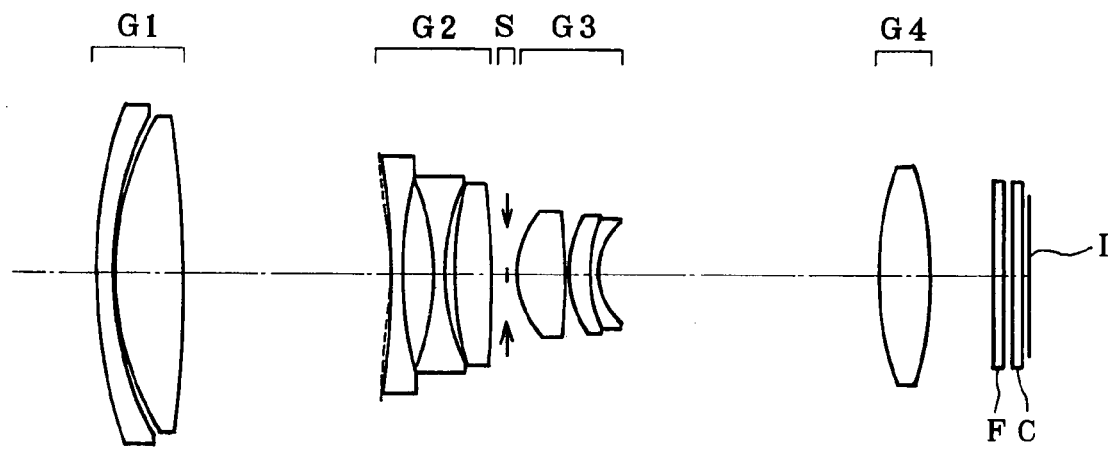

As shown in FIG. 5, Example 5 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves on a convex locus toward the object side and is positioned more on the object side at the telephoto end than at the wide-angle end. The second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of a cemented negative lens of a negative meniscus lens formed of a thin plastic layer and convex on its image side and a double-concave negative lens (with a thin plastic layer applied onto the object-side surface of the double-concave negative lens), a double-concave negative lens and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens. Note here that the cemented negative lens in the second lens group G2 forms the lens component $L_{21}$ that is located on the object side of the second lens group G2 and has negative refracting power.

Five aspheric surfaces are used: one at the image-side surface of the double-convex positive lens in the first lens group G1, one at the surface nearest to the object side of the cemented negative lens in the second lens group G2, two at both surfaces of the double-convex positive lens in the third lens group G3, and one at the object-side surface of the double-convex positive lens in the fourth lens group G4.

EXAMPLE 6

Figure 6A:
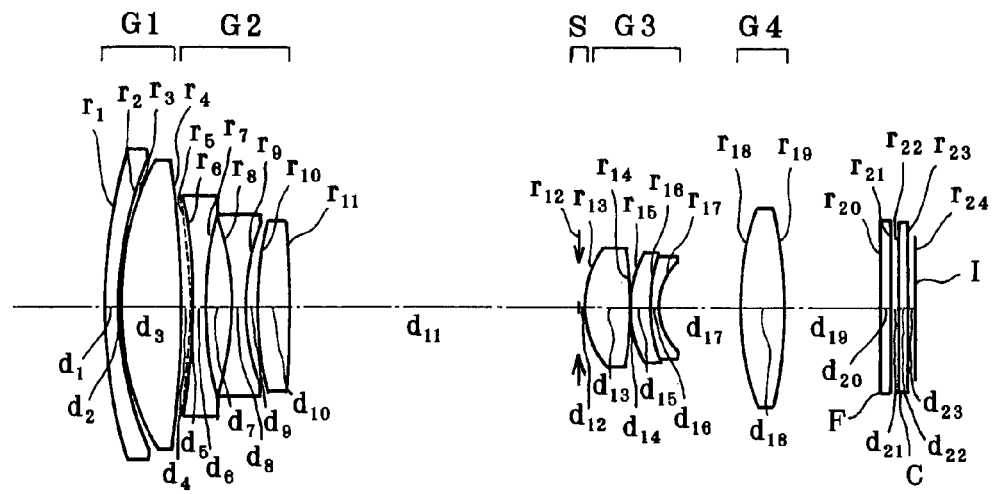
FIG. 6 is illustrative, as in FIG. 1, of Example 6 of the inventive zoom optical system.
Figure 6B:
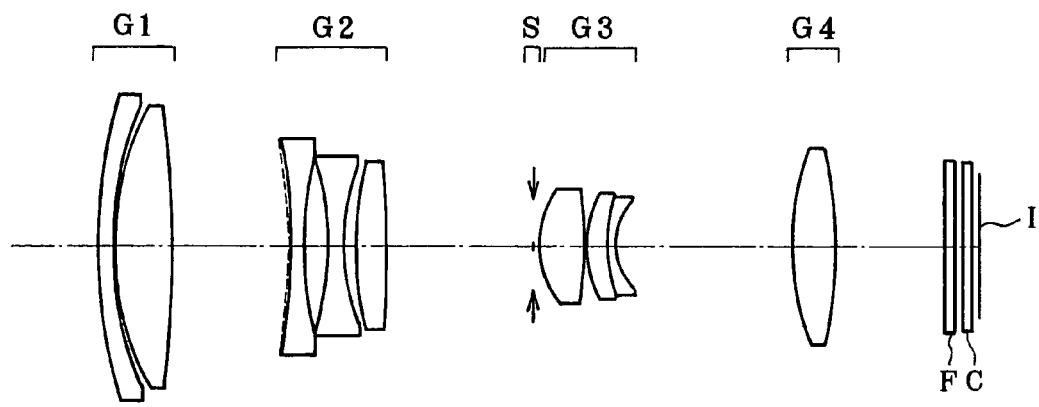
Figure 6C:
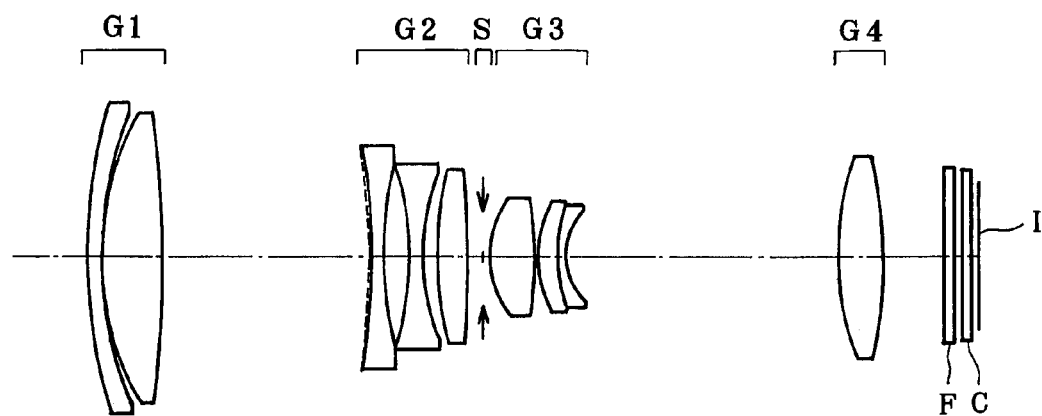

As shown in FIG. 6, Example 6 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves toward the object side, and the second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of a cemented negative lens of a negative meniscus lens formed of a thin plastic layer and convex on its image side and a double-concave negative lens (with a thin plastic layer applied onto the object-side surface of the double-concave negative lens), a double-concave negative lens and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens. Note here that the cemented negative lens in the second lens group G2 forms the lens component $L_{21}$ that is located on the object side of the second lens group G2 and has negative refracting power.

Five aspheric surfaces are used: one at the image-side surface of the double-convex positive lens in the first lens group G1, one at the surface nearest to the object side of the cemented negative lens in the second lens group G2, two at both surfaces of the double-convex positive lens in the third lens group G3, and one at the object-side surface of the double-convex positive lens in the fourth lens group G4.

Note here that the double-convex positive lens in the fourth lens group G4 is formed of plastics.

EXAMPLE 7

Figure 7A:
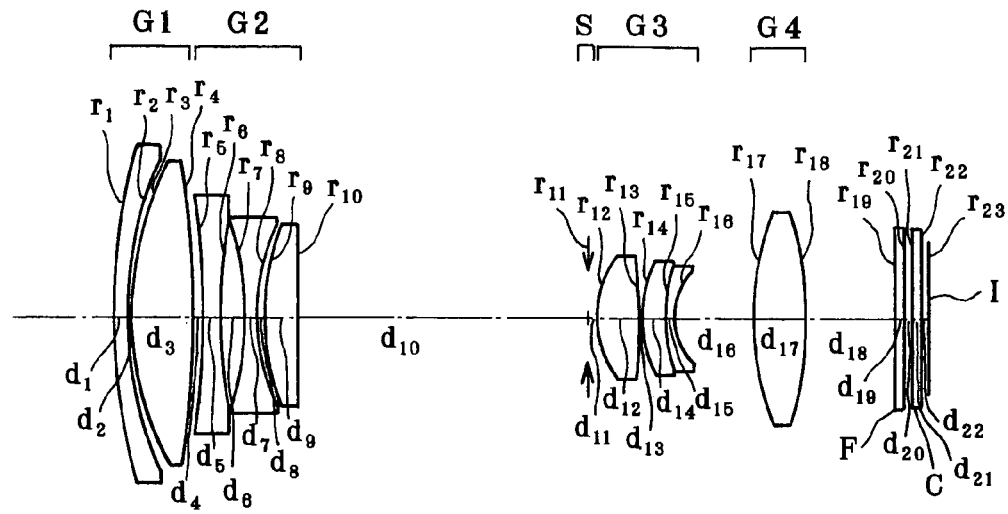
FIG. 7 is illustrative, as in FIG. 1, of Example 7 of the inventive zoom optical system.
Figure 7B:
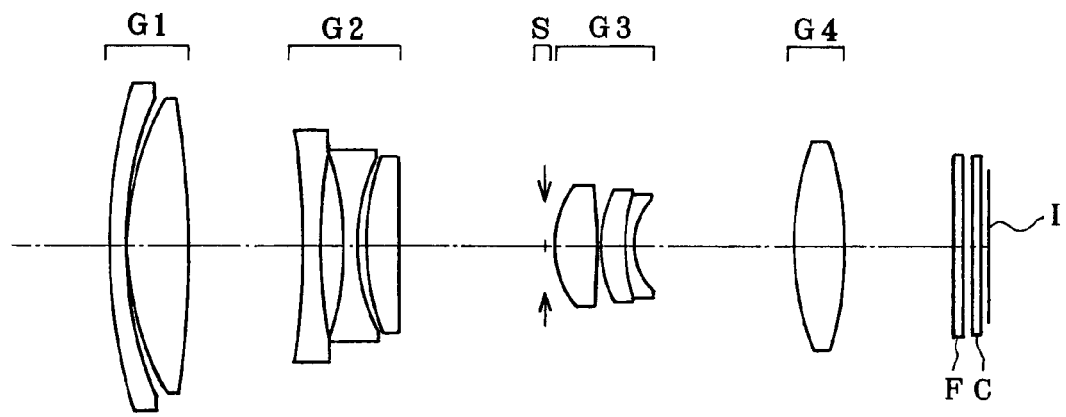
Figure 7C:
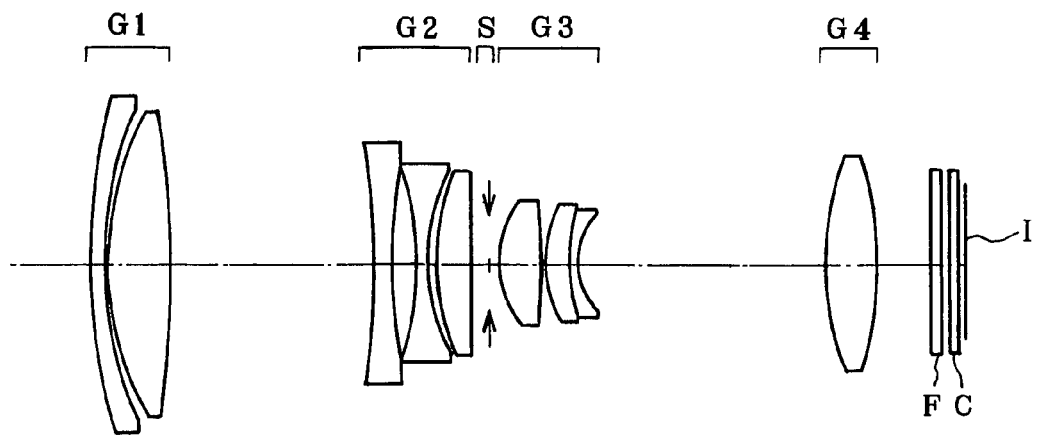
Figure 8A:
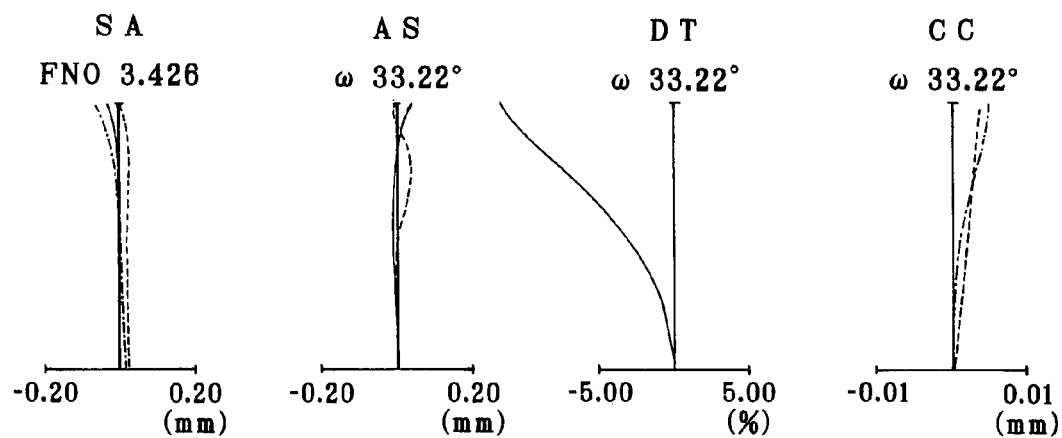
FIG. 8 is an aberration diagram for Example 1 upon focusing on an object point at infinity.
Figure 8B:
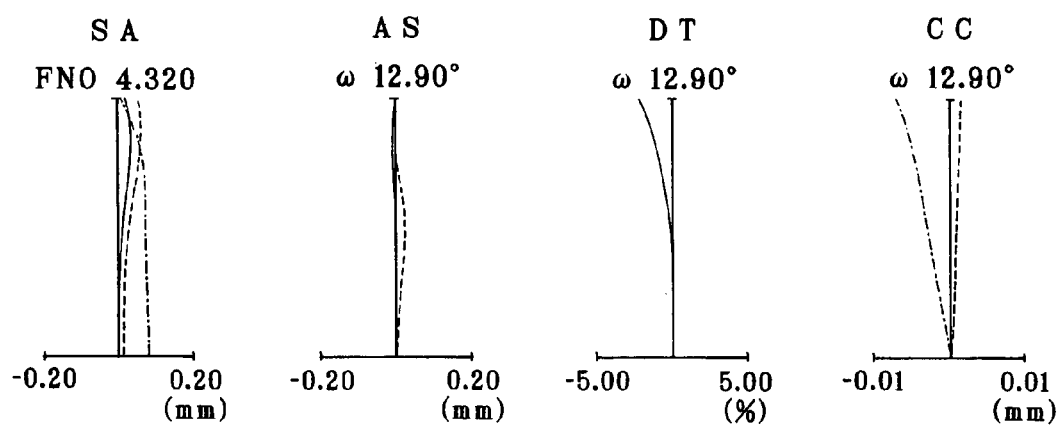
Figure 8C:
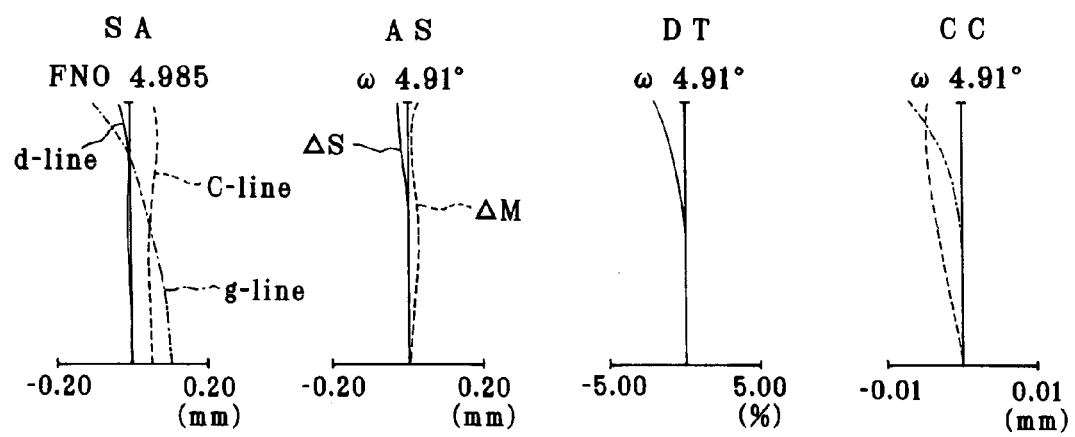
Figure 9A:
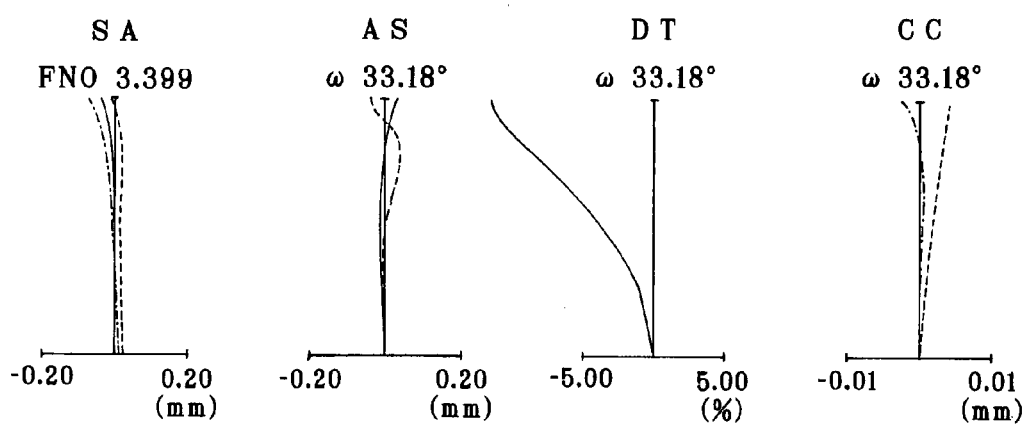
FIG. 9 is an aberration diagram for Example 2 upon focusing on an object point at infinity.
Figure 9B:
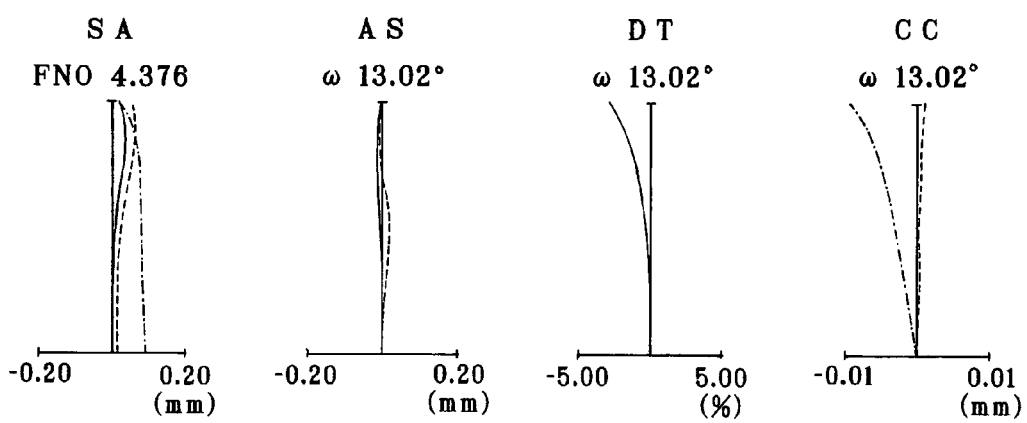
Figure 9C:
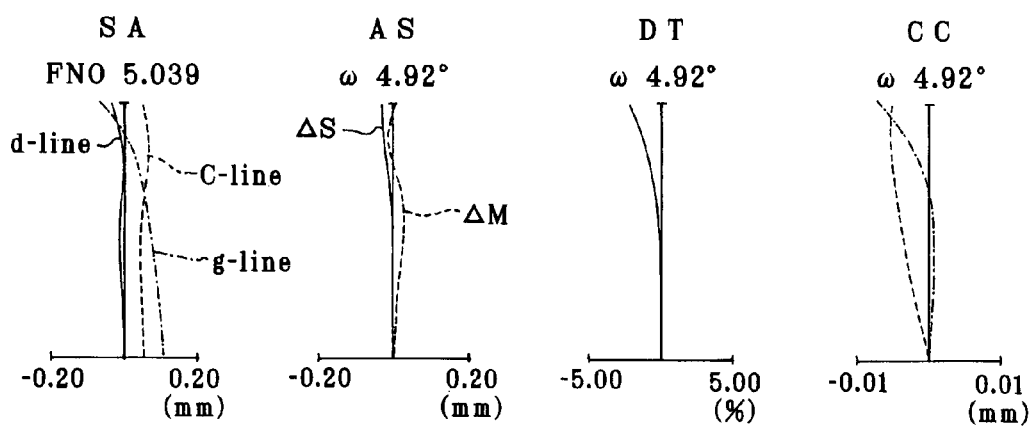
Figure 10A:
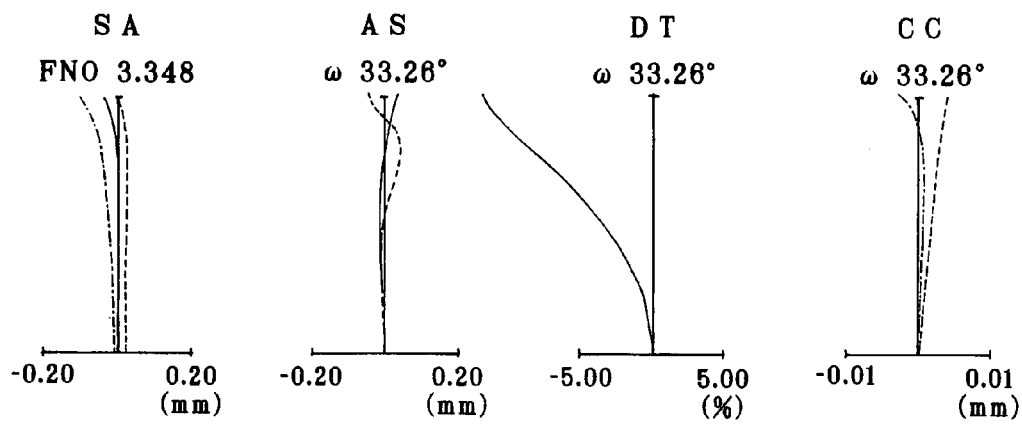
FIG. 10 is an aberration diagram for Example 3 upon focusing on an object point at infinity.
Figure 10B:
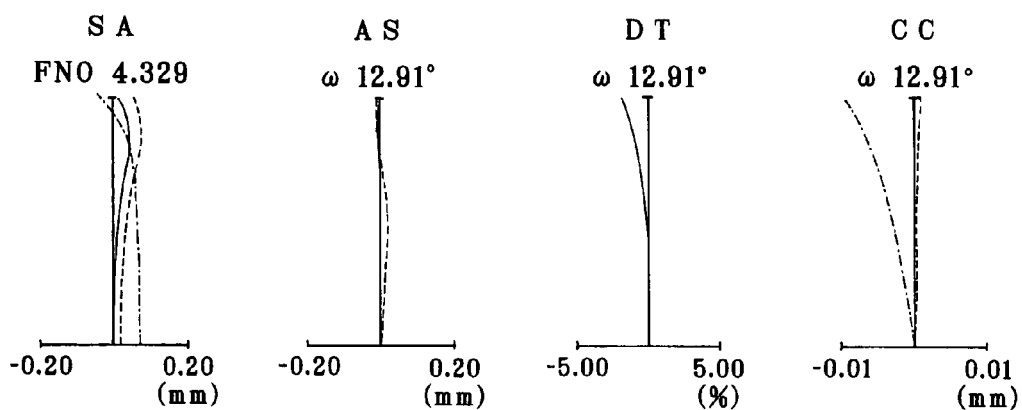
Figure 10C:
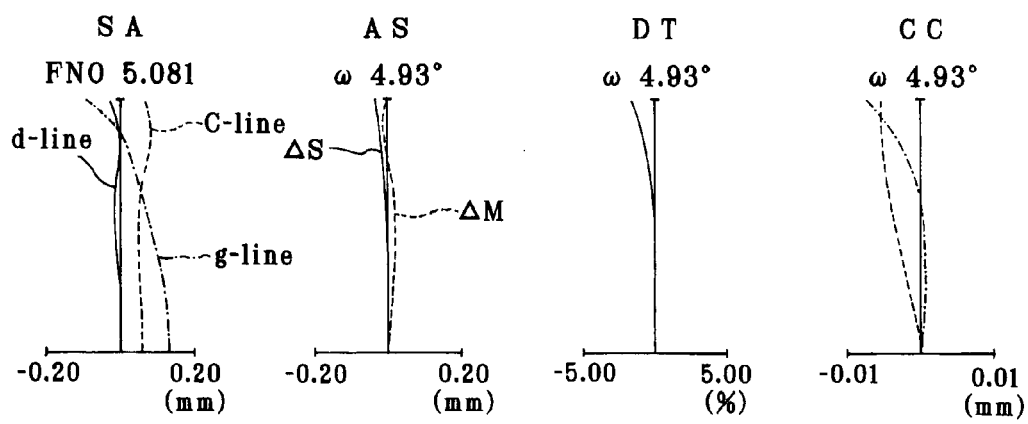
Figure 11A:
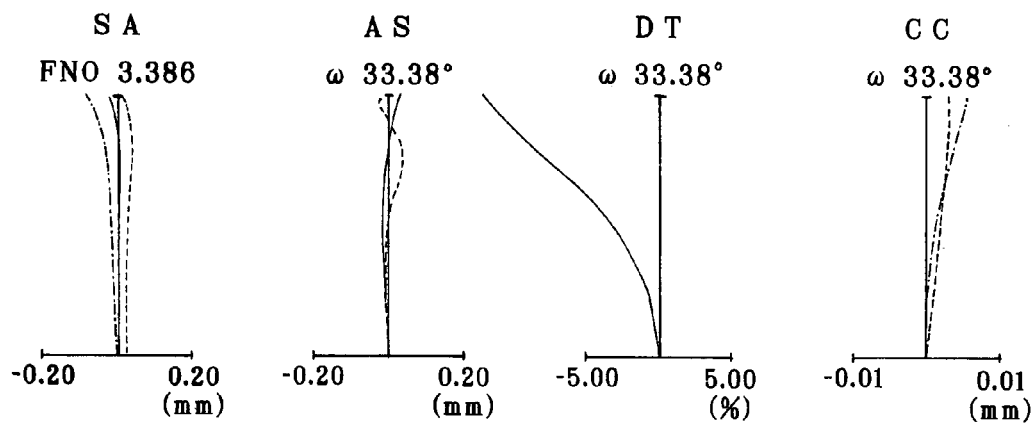
FIG. 11 is an aberration diagram for Example 4 upon focusing on an object point at infinity.
Figure 11B:
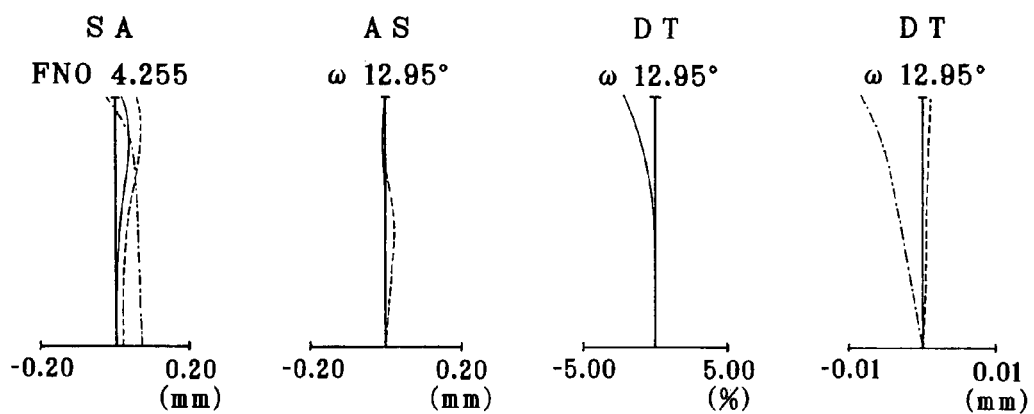
Figure 11C:
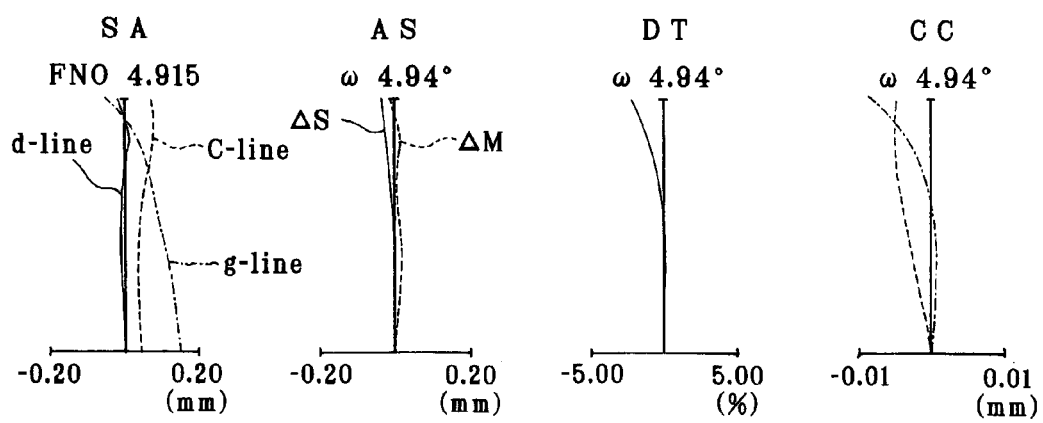
Figure 12A:
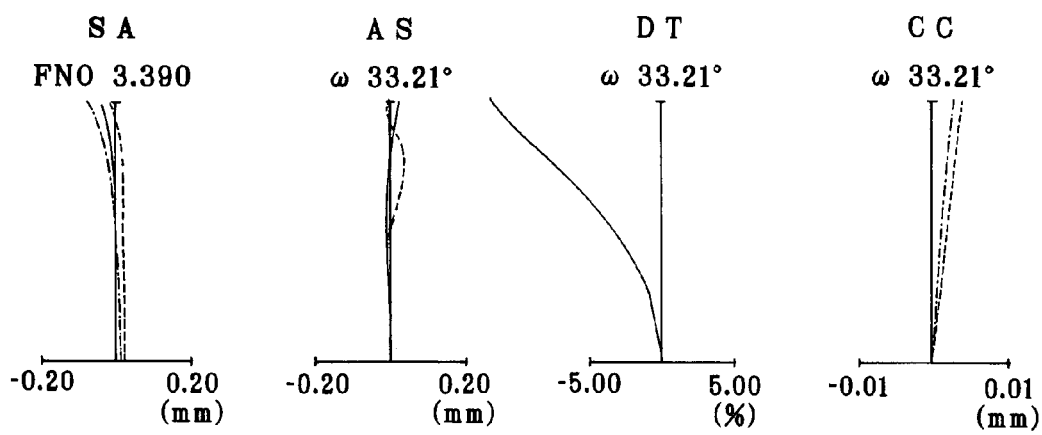
FIG. 12 is an aberration diagram for Example 5 upon focusing on an object point at infinity.
Figure 12B:
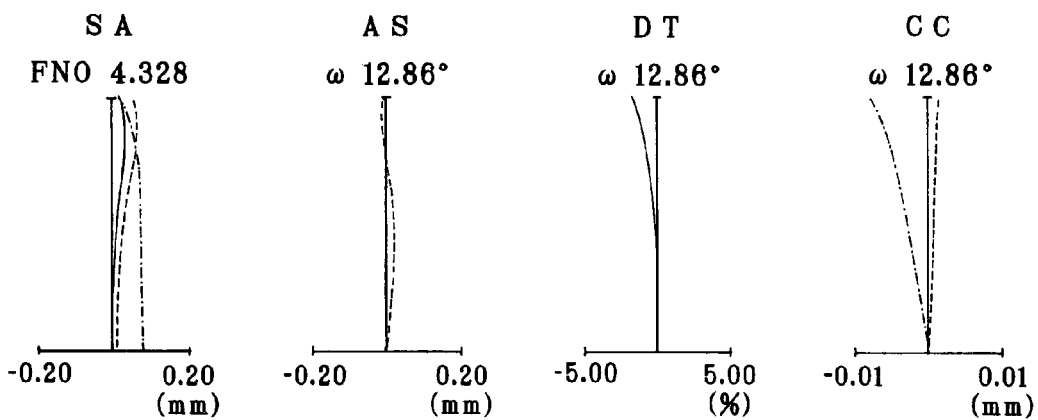
Figure 12C:
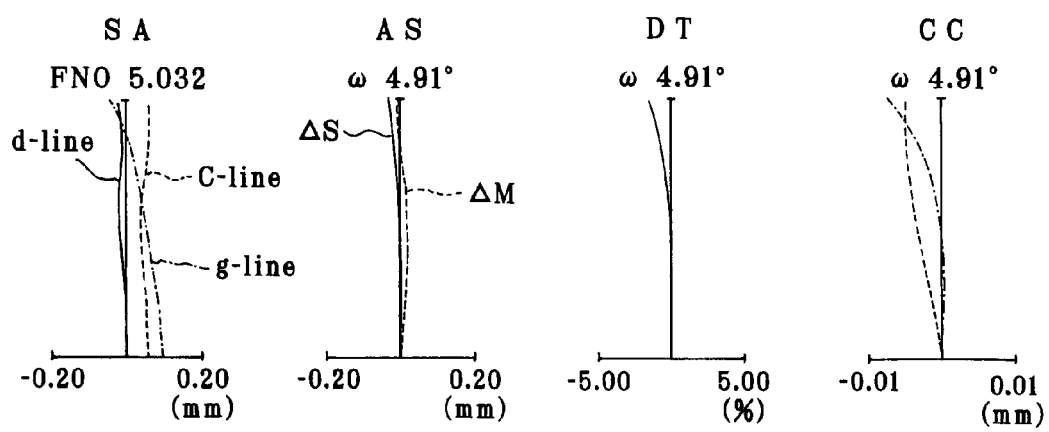
Figure 13A:
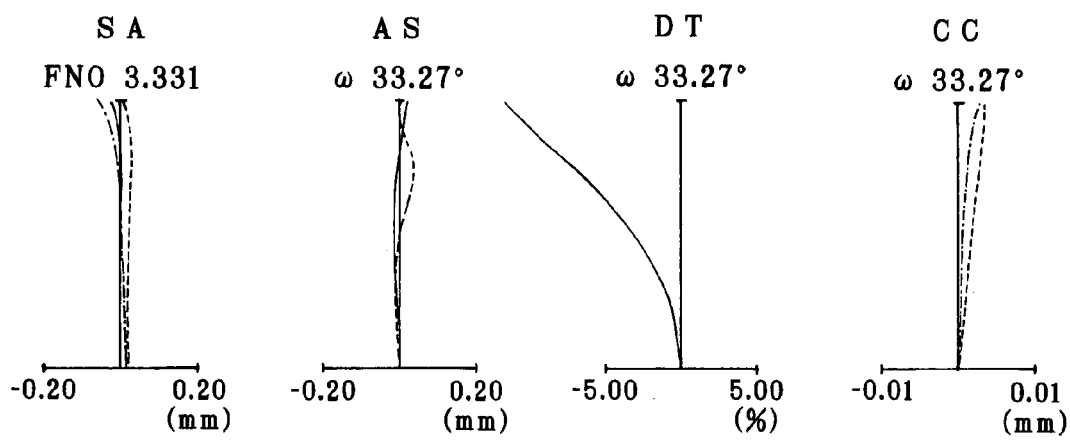
FIG. 13 is an aberration diagram for Example 6 upon focusing on an object point at infinity.
Figure 13B:
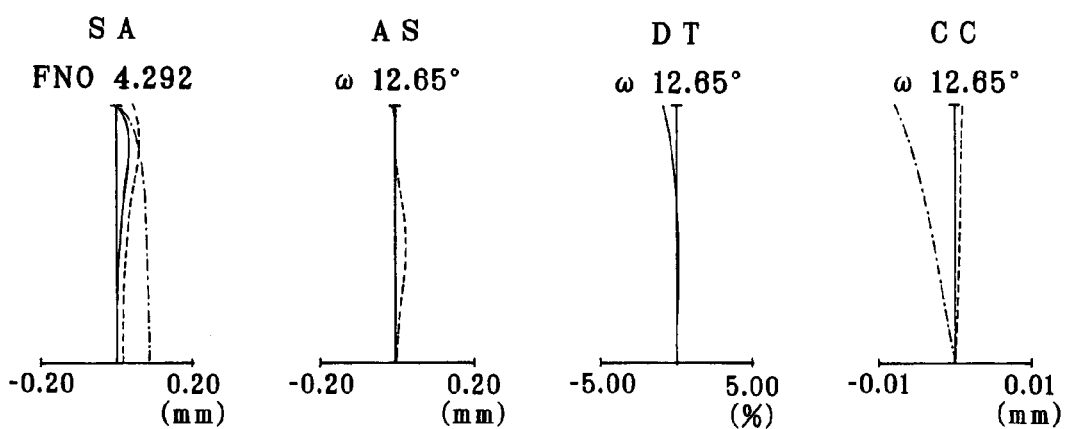
Figure 13C:
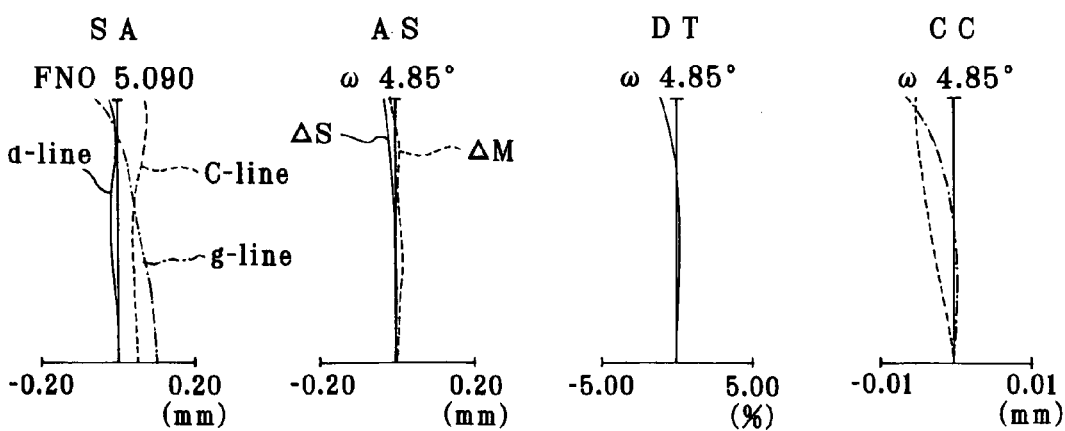
Figure 14A:
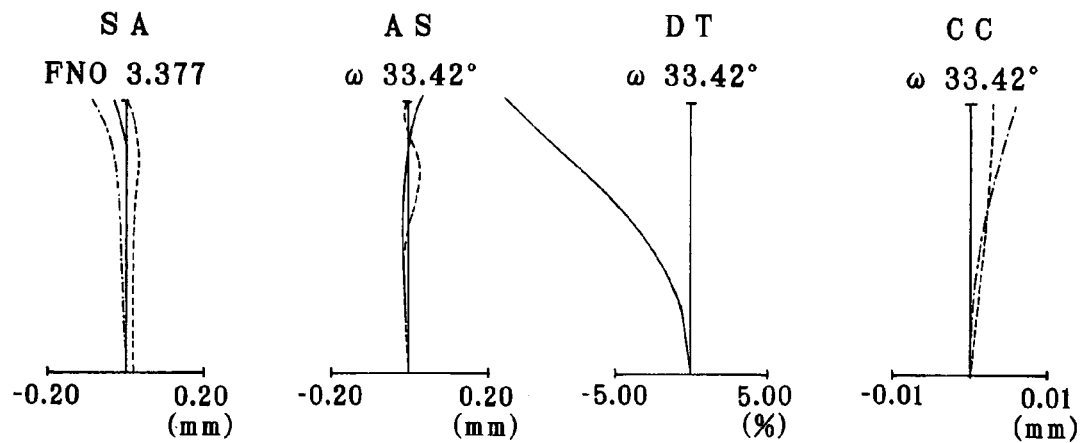
FIG. 14 is an aberration diagram for Example 7 upon focusing on an object point at infinity.
Figure 14B:
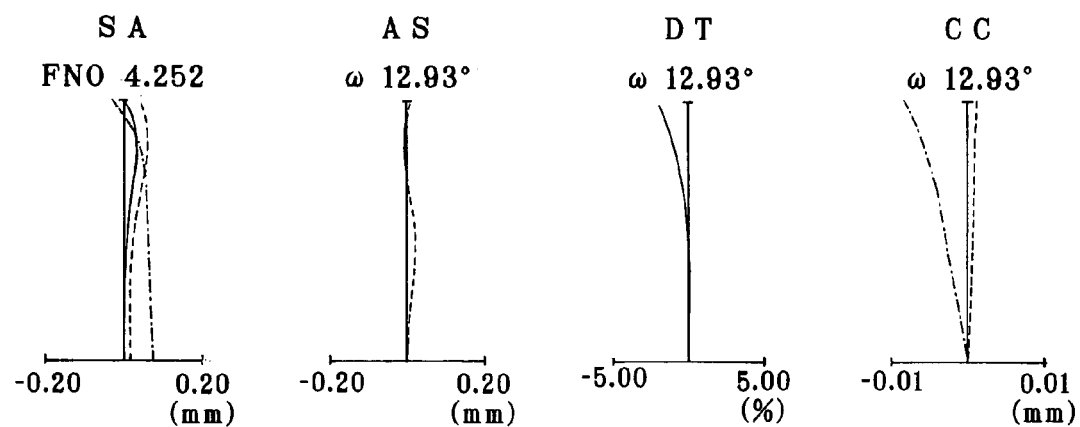
Figure 14C:
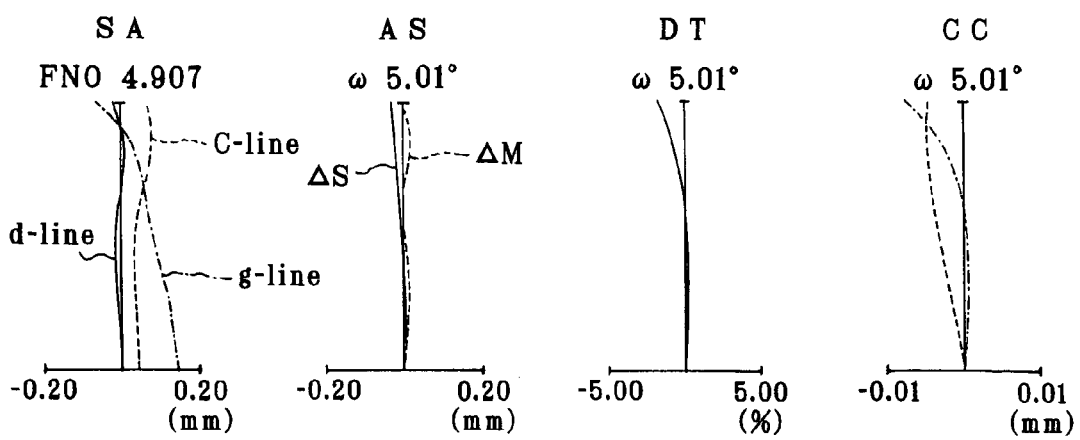

As shown in FIG. 7, Example 7 is directed to a zoom optical system comprising, in order from its object side, the first lens group G1 of positive refracting power, the second lens group G2 of positive refracting power, the aperture stop S, the third lens group G3 of positive refracting power and the fourth lens group G4 of positive refracting power, wherein, upon zooming from the wide-angle end to the telephoto end, the first lens group G1 moves on a convex locus toward the object side and is positioned more on the object side at the telephoto end than at the wide-angle end. The second lens group G2 moves toward the image side while the space between the first lens group G1 and it grows wide. The aperture stop S and the third lens group G3 move in unison toward the object side while the space between the second lens group G2 and it becomes narrow. The fourth lens group G4 moves on a convex locus toward the object side while the space between the third lens group G3 and it grows wide and is positioned more on the image side at the telephoto end than at the wide-angle end.

In order from the object side of the zoom optical system, the first lens group G1 is made up of a negative meniscus lens convex on its object side and a double-convex positive lens; the second lens group G2 is made up of two double-concave negative lenses and a double-convex positive lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Five aspheric surfaces are used: one at the image-side surface of the double-convex positive lens in the first lens group G1, one at the object-side surface of double-concave negative lens in, and on the object side of, the second lens group G2, two at both surfaces of the double-convex positive lens in the third lens group G3, and one at the object-side surface of the double-convex positive lens in the fourth lens group G4.

In Examples 1 to 7 as described above, note that focusing on a near-distance object point is implemented by extending the fourth lens group G4 out toward the object side.

Set out below are the numerical data about each example. Symbols mentioned hereinafter but not hereinbefore have the following meanings:

f: the focal length of the whole optical system,
$F_{NO}$: an F-number,
$2\omega$: an angle of view,
WE: the wide-angle end,
ST: the intermediate state,
TE: the telephoto end,
$r_1, r_2, \ldots$: the radius of curvature of each lens surface,
$d_1, d_2, \ldots$: the space between adjoining lens surfaces,
$n_{d1}, n_{d2}, \ldots$: the d-line refractive index of each lens, and
$\nu_{d1}, \nu_{d2}, \ldots$: the Abbe constant of each lens. Note here that aspheric surface is given by the following equation where x is an optical axis provided that that the direction of travel of light is positive and y is a direction orthogonal to the optical axis.

$$x=(y^2/r)/[1+\{1-(K+1)(y/r)^2\}^{1/2}]$$

$$A_4y^4+A_6y^6+A_8y^8+A_{10}y^{10}+A_{12}y^{12}$$

Here r is the paraxial radius of curvature, K is the conical coefficient, and $A_4, A_6, A_8, A_{10}$ and $A_{12}$ are the $4^{th}$-, $6^{th}$-, $8^{th}$-, $10^{th}$-, and $12^{th}$-order aspheric coefficients, respectively.

EXAMPLE 1

| | | | |
|---|---|---|---|
| $r_1 = 50.000$ | $d_1 = 0.80$ | $n_{d1} = 1.94595$ | $\nu_{d1} = 17.98$ |
| $r_2 = 26.814$ | $d_2 = 0.15$ | | |
| $r_3 = 16.614$ | $d_3 = 3.55$ | $n_{d2} = 1.69350$ | $\nu_{d2} = 53.20$ |
| $r_4 = -38.271$ (Aspheric) | $d_4$ = (Variable) | | |
| $r_5 = -18.680$ (Aspheric) | $d_5 = 0.90$ | $n_{d3} = 1.80610$ | $\nu_{d3} = 40.92$ |
| $r_6 = 31.457$ | $d_6 = 1.52$ | | |
| $r_7 = -11.781$ | $d_7 = 0.65$ | $n_{d4} = 1.88300$ | $\nu_{d4} = 40.76$ |
| $r_8 = 11.281$ | $d_8 = 0.30$ | | |
| $r_9 = 15.787$ | $d_9 = 1.93$ | $n_{d5} = 1.94595$ | $\nu_{d5} = 17.98$ |
| $r_{10} = -47.915$ | $d_{10}$ = (Variable) | | |
| $r_{11} = \infty$ (Stop) | $d_{11} = 0.50$ | | |
| $r_{12} = 4.360$ (Aspheric) | $d_{12} = 2.57$ | $n_{d6} = 1.51633$ | $\nu_{d6} = 64.14$ |
| $r_{13} = -19.946$ (Aspheric) | $d_{13} = 0.15$ | | |
| $r_{14} = 5.690$ | $d_{14} = 1.08$ | $n_{d7} = 1.48749$ | $\nu_{d7} = 70.44$ |
| $r_{15} = 6.517$ | $d_{15} = 0.45$ | $n_{d8} = 2.00069$ | $\nu_{d8} = 25.46$ |
| $r_{16} = 3.303$ | $d_{16}$ = (Variable) | | |
| $r_{17} = 20.215$ (Aspheric) | $d_{17} = 2.83$ | $n_{d9} = 1.58313$ | $\nu_{d9} = 59.46$ |
| $r_{18} = -21.822$ | $d_{18}$ = (Variable) | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (Imaging plane) | | | |

Aspherical Coefficients

4th surface

K = 0.000
$A_4 = 4.75351 \times 10^{-5}$
$A_6 = -1.00754 \times 10^{-7}$
$A_8 = 3.89832 \times 10^{-10}$
$A_{10} = -1.49785 \times 10^{-12}$ 5th surface K = 0.000
$A_4 = 4.13548 \times 10^{-4}$
$A_6 = -3.58791 \times 10^{-6}$
$A_8 = 7.64333 \times 10^{-8}$
$A_{10} = -4.12916 \times 10^{-10}$ 12th surface K = 0.000
$A_4 = -1.01928 \times 10^{-3}$
$A_6 = -1.59341 \times 10^{-5}$
$A_8 = -2.39747 \times 10^{-6}$
$A_{10} = 2.31909 \times 10^{-7}$ 13th surface K = 0.000
$A_4 = 7.79518 \times 10^{-4}$
$A_6 = 2.44400 \times 10^{-5}$
$A_8 = -3.75874 \times 10^{-6}$
$A_{10} = 6.63439 \times 10^{-7}$ 17th surface K = 0.000
$A_4 = 1.96520 \times 10^{-4}$
$A_6 = 9.10322 \times 10^{-6}$
$A_8 = -4.54522 \times 10^{-7}$
$A_{10} = 1.25377 \times 10^{-8}$
$A_{12} = -1.61015 \times 10^{-10}$

Zooming Data ($\infty$)

| | WE | ST | TE |
|---|---|---|---|
| f (mm) | 6.62 | 17.15 | 45.60 |
| $F_{NO}$ | 3.43 | 4.32 | 4.98 |
| $2\omega$ (°) | 66.45 | 25.80 | 9.83 |
| $d_4$ | 0.52 | 6.18 | 11.09 |
| $d_{10}$ | 15.36 | 7.81 | 0.76 |
| $d_{16}$ | 4.25 | 9.14 | 14.03 |
| $d_{18}$ | 5.35 | 6.32 | 3.20 |

EXAMPLE 2

| | | | |
|---|---|---|---|
| $r_1 = 48.780$ | $d_1 = 0.79$ | $n_{d1} = 1.92286$ | $\nu_{d1} = 20.88$ |
| $r_2 = 23.393$ | $d_2 = 0.15$ | | |
| $r_3 = 16.249$ | $d_3 = 3.55$ | $n_{d2} = 1.69350$ | $\nu_{d2} = 53.20$ |
| $r_4 = -35.464$ (Aspheric) | $d_4$ = (Variable) | | |
| $r_5 = -13.697$ (Aspheric) | $d_5 = 0.90$ | $n_{d3} = 1.52542$ | $\nu_{d3} = 55.78$ |
| $r_6 = 24.869$ | $d_6 = 1.53$ | | |
| $r_7 = -11.220$ | $d_7 = 0.65$ | $n_{d4} = 1.88300$ | $\nu_{d4} = 40.76$ |
| $r_8 = 12.355$ | $d_8 = 0.25$ | | |
| $r_9 = 17.922$ | $d_9 = 1.73$ | $n_{d5} = 1.94595$ | $\nu_{d5} = 17.98$ |
| $r_{10} = -52.553$ | $d_{10}$ = (Variable) | | |
| $r_{11} = \infty$ (Stop) | $d_{11} = 0.50$ | | |
| $r_{12} = 4.180$ (Aspheric) | $d_{12} = 2.50$ | $n_{d6} = 1.51633$ | $\nu_{d6} = 64.14$ |
| $r_{13} = -20.541$ (Aspheric) | $d_{13} = 0.15$ | | |
| $r_{14} = 5.398$ | $d_{14} = 0.90$ | $n_{d7} = 1.48749$ | $\nu_{d7} = 70.44$ |
| $r_{15} = 6.090$ | $d_{15} = 0.45$ | $n_{d8} = 2.00069$ | $\nu_{d8} = 25.46$ |
| $r_{16} = 3.199$ | $d_{16}$ = (Variable) | | |
| $r_{17} = 19.649$ (Aspheric) | $d_{17} = 3.14$ | $n_{d9} = 1.52542$ | $\nu_{d9} = 55.78$ |
| $r_{18} = -17.808$ | $d_{18}$ = (Variable) | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (Imaging plane) | | | |

-continued

Aspherical Coefficients

4th surface

K = 0.000
$A_4 = 4.76967 \times 10^{-5}$
$A_6 = -9.03295 \times 10^{-8}$
$A_8 = 5.74061 \times 10^{-10}$
$A_{10} = -3.25169 \times 10^{-12}$ 5th surface K = 0.000
$A_4 = 6.61548 \times 10^{-4}$
$A_6 = -6.48944 \times 10^{-6}$
$A_8 = 1.04474 \times 10^{-7}$
$A_{10} = -4.14549 \times 10^{-10}$ 12th surface K = 0.000
$A_4 = -1.12574 \times 10^{-3}$
$A_6 = -1.51196 \times 10^{-5}$
$A_8 = -3.78767 \times 10^{-6}$
$A_{10} = 3.60740 \times 10^{-7}$ 13th surface K = 0.000
$A_4 = 8.69087 \times 10^{-4}$
$A_6 = 4.01657 \times 10^{-5}$
$A_8 = -6.48254 \times 10^{-6}$
$A_{10} = 1.05570 \times 10^{-6}$ 17th surface K = 0.000
$A_4 = 2.26505 \times 10^{-4}$
$A_6 = 5.24489 \times 10^{-6}$
$A_8 = 3.26670 \times 10^{-9}$
$A_{10} = -8.79532 \times 10^{-9}$
$A_{12} = 1.86304 \times 10^{-10}$ Zooming Data (∞)

|  | WE | ST | TE |
|---|---|---|---|
| f (mm) | 6.62 | 17.07 | 45.63 |
| $F_{NO}$ | 3.40 | 4.38 | 5.04 |
| 2ω (°) | 66.36 | 26.04 | 9.83 |
| $d_4$ | 0.52 | 6.36 | 11.56 |
| $d_{10}$ | 14.73 | 7.76 | 0.74 |
| $d_{16}$ | 4.18 | 9.77 | 14.11 |
| $d_{18}$ | 5.05 | 5.55 | 3.01 |

EXAMPLE 3

| $r_1 = 50.000$ | $d_1 = 0.80$ | $n_{d1} = 1.94595$ | $ν_{d1} = 17.98$ |
| $r_2 = 25.384$ | $d_2 = 0.15$ | | |
| $r_3 = 17.780$ | $d_3 = 3.27$ | $n_{d2} = 1.74330$ | $ν_{d2} = 49.33$ |
| $r_4 = -43.588$ (Aspheric) | $d_4 = $ (Variable) | | |
| $r_5 = -16.052$ (Aspheric) | $d_5 = 0.90$ | $n_{d3} = 1.52542$ | $ν_{d3} = 55.78$ |
| $r_6 = 23.822$ | $d_6 = 1.59$ | | |
| $r_7 = -12.053$ | $d_7 = 0.65$ | $n_{d4} = 1.88300$ | $ν_{d4} = 40.76$ |
| $r_8 = 11.258$ | $d_8 = 0.26$ | | |
| $r_9 = 14.897$ | $d_9 = 1.80$ | $n_{d5} = 1.94595$ | $ν_{d5} = 17.98$ |
| $r_{10} = -129.545$ | $d_{10} = $ (Variable) | | |
| $r_{11} = \infty$ (Stop) | $d_{11} = 0.50$ | | |
| $r_{12} = 4.388$ (Aspheric) | $d_{12} = 2.26$ | $n_{d6} = 1.58313$ | $ν_{d6} = 59.46$ |
| $r_{13} = -20.810$ (Aspheric) | $d_{13} = 0.15$ | | |
| $r_{14} = 6.227$ | $d_{14} = 1.00$ | $n_{d7} = 1.48749$ | $ν_{d7} = 70.44$ |
| $r_{15} = 6.990$ | $d_{15} = 0.45$ | $n_{d8} = 2.00069$ | $ν_{d8} = 25.46$ |
| $r_{16} = 3.277$ | $d_{16} = $ (Variable) | | |
| $r_{17} = 21.235$ (Aspheric) | $d_{17} = 2.90$ | $n_{d9} = 1.52542$ | $ν_{d9} = 55.78$ |
| $r_{18} = -15.314$ | $d_{18} = $ (Variable) | | |
| $r_{19} = \infty$ | $d_{19} = 0.50$ | $n_{d10} = 1.51633$ | $ν_{d10} = 64.14$ |
| $r_{20} = \infty$ | $d_{20} = 0.50$ | | |
| $r_{21} = \infty$ | $d_{21} = 0.50$ | $n_{d11} = 1.51633$ | $ν_{d11} = 64.14$ |
| $r_{22} = \infty$ | $d_{22} = 0.37$ | | |
| $r_{23} = \infty$ (Imaging plane) | | | |

Aspherical Coefficients

4th surface

K = 0.000
$A_4 = 3.39461 \times 10^{-5}$
$A_6 = -3.65869 \times 10^{-8}$
$A_8 = -1.82128 \times 10^{-10}$
$A_{10} = 1.98803 \times 10^{-12}$ 5th surface K = 0.000
$A_4 = 5.46881 \times 10^{-4}$
$A_6 = -5.76790 \times 10^{-6}$
$A_8 = 9.86193 \times 10^{-8}$
$A_{10} = -4.64292 \times 10^{-10}$ 12th surface K = 0.000
$A_4 = -1.08257 \times 10^{-3}$
$A_6 = 2.98331 \times 10^{-6}$
$A_8 = -5.81809 \times 10^{-6}$
$A_{10} = 5.17844 \times 10^{-7}$ 13th surface K = 0.000
$A_4 = 6.93580 \times 10^{-4}$
$A_6 = 4.92321 \times 10^{-5}$
$A_8 = -9.09965 \times 10^{-6}$
$A_{10} = 1.09484 \times 10^{-6}$ 17th surface K = 0.000
$A_4 = 1.46053 \times 10^{-4}$
$A_6 = 9.29281 \times 10^{-6}$
$A_8 = -4.66440 \times 10^{-7}$
$A_{10} = 1.39988 \times 10^{-8}$
$A_{12} = -2.18032 \times 10^{-10}$ Zooming Data (∞)

|  | WE | ST | TE |
|---|---|---|---|
| f (mm) | 6.62 | 17.07 | 45.31 |
| $F_{NO}$ | 3.35 | 4.33 | 5.08 |
| 2ω (°) | 66.53 | 25.82 | 9.86 |
| $d_4$ | 0.51 | 6.44 | 11.68 |
| $d_{10}$ | 14.63 | 7.65 | 0.89 |
| $d_{16}$ | 4.40 | 9.94 | 14.45 |
| $d_{18}$ | 4.78 | 5.28 | 2.97 |

EXAMPLE 4

| $r_1 = 35.000$ | $d_1 = 0.80$ | $n_{d1} = 1.94595$ | $ν_{d1} = 17.98$ |
| $r_2 = 21.519$ | $d_2 = 0.15$ | | |
| $r_3 = 15.856$ | $d_3 = 3.34$ | $n_{d2} = 1.69350$ | $ν_{d2} = 53.20$ |
| $r_4 = -42.740$ (Aspheric) | $d_4 = $ (Variable) | | |
| $r_5 = -21.157$ (Aspheric) | $d_5 = 0.90$ | $n_{d3} = 1.83481$ | $ν_{d3} = 42.71$ |

-continued

| | | | |
|---|---|---|---|
| $r_6 = 32.306$ | $d_6 = 1.47$ | | |
| $r_7 = -12.236$ | $d_7 = 0.65$ | $n_{d4} = 1.88300$ | $\nu_{d4} = 40.76$ |
| $r_8 = 10.974$ | $d_8 = 0.32$ | | |
| $r_9 = 15.031$ | $d_9 = 1.84$ | $n_{d5} = 1.94595$ | $\nu_{d5} = 17.98$ |
| $r_{10} = -72.029$ | $d_{10}$ = (Variable) | | |
| $r_{11} = \infty$ (Stop) | $d_{11} = 0.50$ | | |
| $r_{12} = 4.559$ (Aspheric) | $d_{12} = 2.45$ | $n_{d6} = 1.58313$ | $\nu_{d6} = 59.46$ |
| $r_{13} = -21.705$ (Aspheric) | $d_{13} = 0.30$ | | |
| $r_{14} = 6.006$ | $d_{14} = 1.00$ | $n_{d7} = 1.48749$ | $\nu_{d7} = 70.44$ |
| $r_{15} = 7.342$ | $d_{15} = 0.45$ | $n_8 = 2.00069$ | $\nu_{d8} = 25.46$ |
| $r_{16} = 3.305$ | $d_{16}$ = (Variable) | | |
| $r_{17} = 18.458$ (Aspheric) | $d_{17} = 2.70$ | $n_{d9} = 1.52542$ | $\nu_{d9} = 55.78$ |
| $r_{18} = -18.780$ | $d_{18}$ = (Variable) | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (Imaging plane) | | | |

Aspherical Coefficients

4th surface $K = 0.000$
$A_4 = 4.16555 \times 10^{-5}$
$A_6 = -5.40884 \times 10^{-8}$
$A_8 = -3.76030 \times 10^{-10}$
$A_{10} = 4.65046 \times 10^{-12}$ 5th surface $K = 0.000$
$A_4 = 3.66070 \times 10^{-4}$
$A_6 = -3.46967 \times 10^{-6}$
$A_8 = 7.73761 \times 10^{-8}$
$A_{10} = -3.63463 \times 10^{-10}$ 12th surface $K = 0.000$
$A_4 = -9.01805 \times 10^{-4}$
$A_6 = -1.02157 \times 10^{-5}$
$A_8 = -2.50416 \times 10^{-6}$
$A_{10} = 2.54415 \times 10^{-7}$ 13th surface $K = 0.000$
$A_4 = 7.34153 \times 10^{-4}$
$A_6 = 1.94697 \times 10^{-5}$
$A_8 = -3.89976 \times 10^{-6}$
$A_{10} = 6.17204 \times 10^{-7}$ 17th surface $K = 0.000$
$A_4 = 2.00092 \times 10^{-4}$
$A_6 = 1.85808 \times 10^{-5}$
$A_8 = -1.39689 \times 10^{-6}$
$A_{10} = 5.59649 \times 10^{-8}$
$A_{12} = -9.13926 \times 10^{-10}$ Zooming Data ($\infty$)

| | WE | ST | TE |
|---|---|---|---|
| f (mm) | 6.61 | 17.07 | 45.43 |
| $F_{NO}$ | 3.39 | 4.26 | 4.92 |
| 2ω (°) | 66.76 | 25.90 | 9.89 |
| $d_4$ | 0.51 | 6.16 | 11.11 |
| $d_{10}$ | 15.31 | 7.76 | 0.82 |
| $d_{16}$ | 4.18 | 8.58 | 13.41 |
| $d_{18}$ | 5.02 | 6.11 | 3.09 |

EXAMPLE 5

| | | | |
|---|---|---|---|
| $r_1 = 25.000$ | $d_1 = 0.80$ | $n_{d1} = 1.94595$ | $\nu_{d1} = 17.98$ |
| $r_2 = 17.159$ | $d_2 = 0.15$ | | |
| $r_3 = 14.915$ (Aspheric) | $d_3 = 3.51$ | $n_{d2} = 1.69350$ | $\nu_{d2} = 53.20$ |
| $r_4 = -47.815$ (Aspheric) | $d_4$ = (Variable) | | |
| $r_5 = -16.138$ | $d_5 = 0.05$ | $n_{d3} = 1.52288$ | $\nu_{d3} = 52.50$ |
| $r_6 = -40.492$ | $d_6 = 0.75$ | $n_{d4} = 1.83481$ | $\nu_{d4} = 42.71$ |
| $r_7 = 25.804$ | $d_7 = 1.49$ | | |
| $r_8 = -12.406$ | $d_8 = 0.65$ | $n_{d5} = 1.88300$ | $\nu_{d5} = 40.76$ |
| $r_9 = 11.312$ | $d_9 = 0.48$ | | |
| $r_{10} = 16.986$ | $d_{10} = 1.85$ | $n_{d6} = 1.94595$ | $\nu_{d6} = 17.98$ |
| $r_{11} = -50.960$ | $d_{11}$ = (Variable) | | |
| $r_{12} = \infty$ (Stop) | $d_{12} = 0.50$ | | |
| $r_{13} = 4.402$ (Aspheric) | $d_{13} = 2.54$ | $n_{d7} = 1.51633$ | $\nu_{d7} = 64.14$ |
| $r_{14} = -18.772$ (Aspheric) | $d_{14} = 0.15$ | | |
| $r_{15} = 5.696$ | $d_{15} = 1.01$ | $n_{d8} = 1.48749$ | $\nu_{d8} = 70.44$ |
| $r_{16} = 6.606$ | $d_{16} = 0.45$ | $n_{d9} = 2.00069$ | $\nu_{d9} = 25.46$ |
| $r_{17} = 3.368$ | $d_{17}$ = (Variable) | | |
| $r_{18} = 21.508$ (Aspheric) | $d_{18} = 2.50$ | $n_{d10} = 1.58313$ | $\nu_{d10} = 59.46$ |
| $r_{19} = -21.022$ | $d_{19}$ = (Variable) | | |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.50$ | $n_{d12} = 1.51633$ | $\nu_{d12} = 64.14$ |
| $r_{23} = \infty$ | $d_{23} = 0.37$ | | |
| $r_{24} = \infty$ (Imaging plane) | | | |

Aspherical Coefficients

4th surface $K = 0.000$
$A_4 = 3.59203 \times 10^{-5}$
$A_6 = -4.72285 \times 10^{-8}$
$A_8 = -3.21644 \times 10^{-11}$
$A_{10} = 1.24013 \times 10^{-12}$ 5th surface $K = 0.000$
$A_4 = 6.57952 \times 10^{-4}$
$A_6 = -8.50187 \times 10^{-6}$
$A_8 = 1.78708 \times 10^{-7}$
$A_{10} = -1.22119 \times 10^{-9}$ 13th surface $K = 0.000$
$A_4 = -1.06776 \times 10^{-3}$
$A_6 = -1.41521 \times 10^{-5}$
$A_8 = -2.73899 \times 10^{-6}$
$A_{10} = 2.07446 \times 10^{-7}$ 14th surface $K = 0.000$
$A_4 = 6.77095 \times 10^{-4}$
$A_6 = 2.56673 \times 10^{-5}$
$A_8 = -4.33897 \times 10^{-6}$
$A_{10} = 5.88569 \times 10^{-7}$ 18th surface $K = 0.000$
$A_4 = 1.54460 \times 10^{-4}$
$A_6 = 9.65081 \times 10^{-6}$
$A_8 = -6.32991 \times 10^{-7}$
$A_{10} = 2.45318 \times 10^{-8}$
$A_{12} = -4.09182 \times 10^{-10}$ Zooming Data ($\infty$)

| | WE | ST | TE |
|---|---|---|---|
| f (mm) | 6.62 | 17.11 | 45.35 |
| $F_{NO}$ | 3.39 | 4.33 | 5.03 |
| 2ω (°) | 66.41 | 25.73 | 9.83 |
| $d_4$ | 0.52 | 5.99 | 10.73 |
| $d_{11}$ | 14.87 | 7.66 | 0.77 |

-continued

| | | | |
|---|---|---|---|
| $d_{17}$ | 4.34 | 9.81 | 14.71 |
| $d_{19}$ | 5.59 | 6.28 | 3.41 |

EXAMPLE 6

| | | | |
|---|---|---|---|
| $r_1 = 28.000$ | $d_1 = 0.80$ | $n_{d1} = 1.94595$ | $\nu_{d1} = 17.98$ |
| $r_2 = 19.012$ | $d_2 = 0.15$ | | |
| $r_3 = 16.116$ (Aspheric) | $d_3 = 3.28$ | $n_{d2} = 1.69350$ | $\nu_{d2} = 53.21$ |
| $r_4 = -48.983$ (Aspheric) | $d_4 =$ (Variable) | | |
| $r_5 = -20.896$ | $d_5 = 0.10$ | $n_{d3} = 1.52288$ | $\nu_{d3} = 52.50$ |
| $r_6 = -35.220$ | $d_6 = 0.75$ | $n_{d4} = 1.83481$ | $\nu_{d4} = 42.71$ |
| $r_7 = 21.537$ | $d_7 = 1.44$ | | |
| $r_8 = -15.020$ | $d_8 = 0.65$ | $n_{d5} = 1.88300$ | $\nu_{d5} = 40.76$ |
| $r_9 = 11.701$ | $d_9 = 0.70$ | | |
| $r_{10} = 17.256$ | $d_{10} = 1.76$ | $n_{d6} = 1.94595$ | $\nu_{d6} = 17.98$ |
| $r_{11} = -76.194$ | $d_{11} =$ (Variable) | | |
| $r_{12} = \infty$ (Stop) | $d_{12} = 0.30$ | | |
| $r_{13} = 4.805$ (Aspheric) | $d_{13} = 2.44$ | $n_{d7} = 1.58913$ | $\nu_{d7} = 61.28$ |
| $r_{14} = -23.494$ (Aspheric) | $d_{14} = 0.15$ | | |
| $r_{15} = 6.157$ | $d_{15} = 1.12$ | $n_{d8} = 1.48749$ | $\nu_{d8} = 70.23$ |
| $r_{16} = 7.544$ | $d_{16} = 0.45$ | $n_{d9} = 2.00069$ | $\nu_{d9} = 25.46$ |
| $r_{17} = 3.458$ | $d_{17} =$ (Variable) | | |
| $r_{18} = 17.573$ (Aspheric) | $d_{18} = 2.50$ | $n_{d10} = 1.52542$ | $\nu_{d10} = 55.78$ |
| $r_{19} = -21.811$ | $d_{19} =$ (Variable) | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.50$ | | |
| $r_{22} = \infty$ | $d_{22} = 0.50$ | $n_{d12} = 1.51633$ | $\nu_{d12} = 64.14$ |
| $r_{23} = \infty$ | $d_{23} = 0.37$ | | |
| $r_{24} = \infty$ (Imaging plane) | | | |

Aspherical Coefficients

4th surface $K = 0.000$
$A_4 = 3.09667 \times 10^{-5}$
$A_6 = -1.81441 \times 10^{-8}$
$A_8 = -7.60813 \times 10^{-10}$
$A_{10} = 7.49426 \times 10^{-12}$ 5th surface $K = 0.000$
$A_4 = 4.66246 \times 10^{-4}$
$A_6 = -7.42642 \times 10^{-6}$
$A_8 = 1.84217 \times 10^{-7}$
$A_{10} = -1.81602 \times 10^{-9}$ 13th surface $K = 0.000$
$A_4 = -8.38825 \times 10^{-4}$
$A_6 = -1.18444 \times 10^{-5}$
$A_8 = -2.04327 \times 10^{-6}$
$A_{10} = 1.19990 \times 10^{-7}$ 14th surface $K = 0.000$
$A_4 = 4.65722 \times 10^{-4}$
$A_6 = 9.18166 \times 10^{-6}$
$A_8 = -2.98004 \times 10^{-6}$
$A_{10} = 3.08947 \times 10^{-7}$ 18th surface $K = 0.000$
$A_4 = 8.45223 \times 10^{-5}$
$A_6 = 1.71828 \times 10^{-5}$
$A_8 = -1.27264 \times 10^{-6}$
$A_{10} = 5.17279 \times 10^{-8}$
$A_{12} = -8.50832 \times 10^{-10}$ -continued Zooming Data ($\infty$)

| | WE | ST | TE |
|---|---|---|---|
| f (mm) | 6.62 | 17.25 | 45.68 |
| $F_{NO}$ | 3.33 | 4.29 | 5.09 |
| $2\omega$ (°) | 66.53 | 25.30 | 9.70 |
| $d_4$ | 0.52 | 6.32 | 11.33 |
| $d_{11}$ | 15.98 | 8.04 | 0.86 |
| $d_{17}$ | 4.62 | 10.07 | 15.39 |
| $d_{19}$ | 5.19 | 5.90 | 3.31 |

EXAMPLE 7

| | | | |
|---|---|---|---|
| $r_1 = 30.000$ | $d_1 = 0.80$ | $n_{d1} = 1.94595$ | $\nu_{d1} = 17.98$ |
| $r_2 = 19.427$ | $d_2 = 0.15$ | | |
| $r_3 = 15.261$ | $d_3 = 3.25$ | $n_{d2} = 1.69350$ | $\nu_{d2} = 53.20$ |
| $r_4 = -46.728$ (Aspheric) | $d_4 =$ (Variable) | | |
| $r_5 = -25.340$ (Aspheric) | $d_5 = 0.90$ | $n_{d3} = 1.83481$ | $\nu_{d3} = 42.71$ |
| $r_6 = 22.000$ | $d_6 = 1.42$ | | |
| $r_7 = -15.101$ | $d_7 = 0.65$ | $n_{d4} = 1.88300$ | $\nu_{d4} = 40.76$ |
| $r_8 = 10.029$ | $d_8 = 0.43$ | | |
| $r_9 = 12.988$ | $d_9 = 1.83$ | $n_{d5} = 1.94595$ | $\nu_{d5} = 17.98$ |
| $r_{10} = -444.889$ | $d_{10} =$ (Variable) | | |
| $r_{11} = \infty$ (Stop) | $d_{11} = 0.50$ | | |
| $r_{12} = 4.675$ (Aspheric) | $d_{12} = 2.30$ | $n_{d6} = 1.58313$ | $\nu_{d6} = 59.46$ |
| $r_{13} = -22.162$ (Aspheric) | $d_{13} = 0.15$ | | |
| $r_{14} = 5.902$ | $d_{14} = 1.25$ | $n_{d7} = 1.48749$ | $\nu_{d7} = 70.44$ |
| $r_{15} = 7.682$ | $d_{15} = 0.50$ | $n_{d8} = 2.00069$ | $\nu_{d8} = 25.46$ |
| $r_{16} = 3.311$ | $d_{16} =$ (Variable) | | |
| $r_{17} = 17.539$ (Aspheric) | $d_{17} = 2.70$ | $n_{d9} = 1.52542$ | $\nu_{d9} = 55.78$ |
| $r_{18} = -18.997$ | $d_{18} =$ (Variable) | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (Imaging plane) | | | |

Aspherical Coefficients

4th surface $K = 0.000$
$A_4 = 3.91299 \times 10^{-5}$
$A_6 = -2.37241 \times 10^{-8}$
$A_8 = -9.74933 \times 10^{-10}$
$A_{10} = 9.42297 \times 10^{-12}$ 5th surface $K = 0.000$
$A_4 = 2.89020 \times 10^{-4}$
$A_6 = -3.84414 \times 10^{-6}$
$A_8 = 1.02143 \times 10^{-7}$
$A_{10} = -1.03098 \times 10^{-9}$ 12th surface $K = 0.000$
$A_4 = -7.85176 \times 10^{-4}$
$A_6 = -1.27107 \times 10^{-5}$
$A_8 = -2.05000 \times 10^{-6}$
$A_{10} = 3.09824 \times 10^{-7}$ 13th surface $K = 0.000$
$A_4 = 7.37881 \times 10^{-4}$
$A_6 = 7.72037 \times 10^{-6}$
$A_8 = -2.42546 \times 10^{-6}$
$A_{10} = 5.98491 \times 10^{-7}$ -continued 17th surface K = 0.000
$A_4 = 1.47559 \times 10^{-4}$
$A_6 = 2.22902 \times 10^{-5}$
$A_8 = -1.71059 \times 10^{-6}$
$A_{10} = 6.96801 \times 10^{-8}$
$A_{12} = -1.13462 \times 10^{-9}$ Zooming Data (∞)

|  | WE | ST | TE |
|---|---|---|---|
| f (mm) | 6.59 | 17.07 | 44.66 |
| $F_{NO}$ | 3.38 | 4.25 | 4.91 |
| 2ω (°) | 66.84 | 25.86 | 10.02 |
| $d_4$ | 0.51 | 6.10 | 10.94 |
| $d_{10}$ | 15.31 | 7.69 | 0.96 |
| $d_{16}$ | 4.33 | 8.70 | 13.38 |
| $d_{18}$ | 4.79 | 5.90 | 2.97 |

FIGS. 8 to 14 are aberration diagrams for Examples 1 to 7 upon focusing on an object point at infinity. In these aberration diagrams, (a), (b) and (c) are indicative of spherical aberrations (SA), astigmatism (AS), distortion (DT) and chromatic aberration of magnification (CC) at the wide-angle end, in the intermediate state, and at the telephoto end, respectively.

Set out below are the values of conditions (1) to (8) in the aforesaid Examples 1 to 7.

| Example | 1 | 2 | 3 | 4 | 5 | 6 | 7 |
|---|---|---|---|---|---|---|---|
| (1) | −0.25 | −0.29 | −0.19 | −0.21 | −0.23 | −0.02 | 0.07 |
| (2) | 2.06 | 2.36 | 2.53 | 2.18 | 3.64 | 4.02 | 2.02 |
| (3) | 0.58 | 0.58 | 0.58 | 0.58 | 0.58 | 0.58 | 0.58 |
| (4) | 0.52 | 0.54 | 0.56 | 0.52 | 0.51 | 0.54 | 0.53 |
| (5) | −3.36 | −3.47 | −3.52 | −3.41 | −3.40 | −3.37 | −3.41 |
| (6) | 2.24 | 2.54 | 2.78 | 2.35 | 3.77 | 4.01 | 2.07 |
| (7) | 0.69 | 0.70 | 0.70 | 0.70 | 0.69 | 0.70 | 0.70 |
| (8) | −0.50 | −0.49 | −0.79 | −0.65 | −0.50 | −0.63 | −0.94 |

The aforesaid inventive zoom optical systems are all characterized in that the second lens group G2 is positioned more on the imaging plane side at the telephoto end than at the wide-angle end. In the invention, the second lens group G2 is designed to have the greatest effect on zooming; the zoom optical system can likely have a higher zoom ratio by keeping the space between the first lens group G1 and the second lens group G2 wider. To allow the zoom optical system to have a longer focal length on the telephoto side while cutting back on the total length on the telephoto side, the position of the second lens group G2 should preferably be as much away from the first lens group G1 as possible.

The third lens group G3 is also permitted to move thereby sharing zooming operation together with the second lens group G2. With an optical system with the third lens group G3 staying fixed, there is a large fluctuation of the position of the entrance pupil in association with zooming, resulting in an increase in the diameter of the lenses in the first lens group G1, which would otherwise be detrimental to size reductions of the whole optical system as well as size reductions of the optical system upon received at a lens mount.

To add to this, the negative lens component is located in, and nearest to the object side of, the second lens group G2. If the principal point position of the second lens group G2 is as close to the first lens group G1 as possible, it would make a lot more contribution to size reductions and higher zoom ratios. Accordingly, in most prior arts, too, a negative lens component is located in, and nearest to the object side of, the second lens group G2. However, that lens component has often a large effective diameter and a curved surface deep on the imaging plane side. A deep curved surface is less likely to have good surface precision at its edge and make sure good off-axis performance at the wide-angle end. Its large volume is another obstacle to achieving size reductions, and size reductions upon received at a lens mount in particular. The proper location of the negative lens component in the second lens group G2 offers a sensible tradeoff between size reductions and optical performance while making sure processing capabilities.

As noted above, the invention relates to a small-format yet high-zoom-ratio zoom optical system comprising, in order from its object side, the first lens group having positive refracting power, the second lens group having negative refracting power, the third lens group having positive refracting power and the fourth lens group having positive refracting power, wherein the first to fourth lens groups are moved at least along the optical axis toward the imaging plane side and received in a lens mount with its full length curtailed. Alternatively, if some lens groups are moved to a position off the optical axis, it is then possible to make axial thickness small so that the optical system can be received thinner in a lens mount.

In the aforesaid examples, the cover glass G that is a plane-parallel plate and the optical low-pass filter F are located near the imaging plane. However, these filters may be allowed to have curvature and configured as a condenser lens or a field flattener.

And now, with the zoom lens (zoom optical system) of the invention, image distortion may be corrected in an electrically digital way. The basic concept of how image distortion is digitally corrected is now explained.

Figure 15:
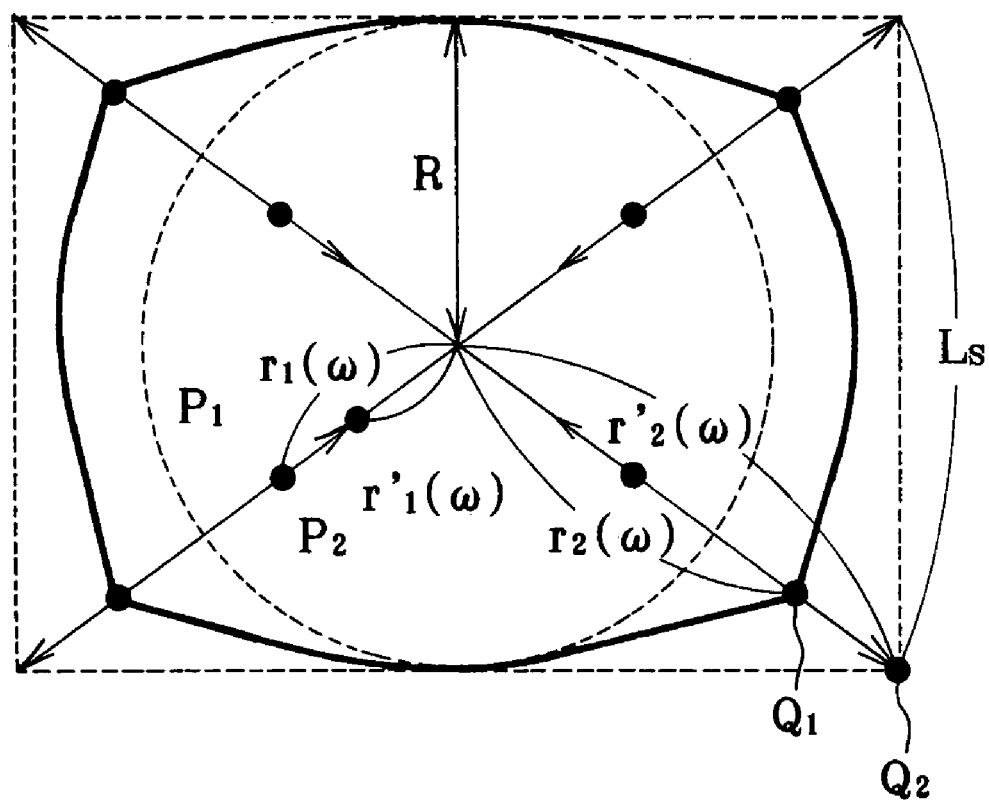
FIG. 15 is illustrative in basic conception of how to make digital correction of image distortion.

As shown typically in FIG. 151, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius r(ω) are moved in substantially radial directions; they are concentrically moved to a radius r' (ω) for correction. In FIG. 15 as an example, a point $P_1$ on the circumference of an arbitrary circle of radius $r_1$ (ω) positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2$(ω) positioned outside the circle of radius R is moved to a point $Q_2$ on the circumference of a circle of radius $r_2'$ (ω) to be corrected in a direction away from the center of the circle. Here, r' (ω) is represented by $$r'(\omega) = \alpha f \tan \omega \, (0 \leq \alpha \leq 1)$$

where ω is a subject half angle of view, and f is the focal length of an imaging optical system (the zoom optical system in the invention).

Here let Y be an ideal image height corresponding to on the aforesaid circle of radius R. Then, $$\alpha = R/Y = R/f \tan \omega$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius r(ω) moved in substantially radial directions to move them concentrically to radius r'(ω).

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid circle. It is therefore preferable to make use of a method that determines coordinates $(X_i', Y_j')$ for where the points are to be moved to per each pixel $(X_i, Y_j)$. Note that when two or more points $(X_i, Y_j)$ are moved to the coordinates $(X_i', Y_j')$, there is the average of the values the respective pixels have taken, and when there are no incoming points, interpolation may be implemented using the values of the coordinates $(X_i', Y_j')$ for some neighboring pixels.

Such a method is effective for especially when the aforesaid circle of radius R written on the aforesaid optical image becomes badly distorted and asymmetric with respect to the optical axis for the reason of fabrication errors of the optical system and electronic imaging device of an electronic imaging system the zoom lens has. That method is also effective for correction of geometric distortion or the like occurring at the time of reproduction of signals as an image at the imaging device or various output devices.

With the electronic imaging system of the invention, r(ω), i.e., the relation between the half angle of view and the image height or the relation between the real image height r and the ideal image height r'/α may have been recorded in a recording medium built in it for the purpose of figuring out r'(ω)−r(ω).

It is here noted that to prevent the image after the correction of distortion from running extremely short of light quantity at both ends in the short side direction, it is preferable for the aforesaid radius R to satisfy the following condition:

$$0 \leq R \leq 0.6 L_s$$

where $L_s$ is the length of the short side of the effective imaging plane.

For the aforesaid radius R it is more preferable to satisfy the following condition.

$$0.3 L_s \leq R \leq 0.6 L_s$$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of images; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially r'(ω)=αf tan ω at or near the telephoto end within the divided focal zones. In that case, however, there is some barrel distortion remaining at the wide-angle end within the divided focal zones. Too many divided zones are not that preferable because of the need of storing too much intrinsic data necessary for correction in the recording medium. Therefore, one or few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially r'(ω)=αf tan ω at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $$f = y / \tan \omega$$

Here y is the height (image height) of an image point from the optical axis, f is the focal length of an imaging system (the zoom lens in the invention), and ω is the angle (subject half angle of view) with the optical axis of an object point direction corresponding to an image point formed from the center on the imaging plane to the position of y.

When there is barrel distortion in the imaging system, $$f > y / \tan \omega$$

It follows that with both the focal length f of the imaging system and the image height y kept constant, the value of ω grows large.

Figure 16:
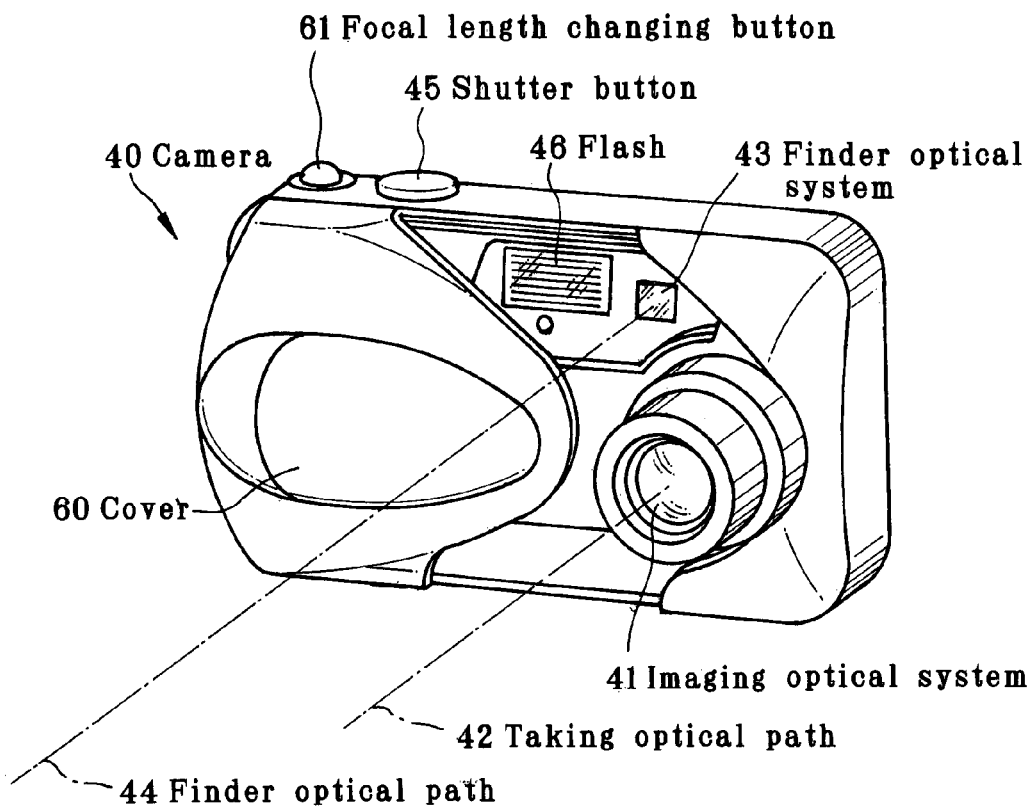
FIG. 16 is a front perspective view of the outside shape of a digital camera according to the invention.
Figure 17:
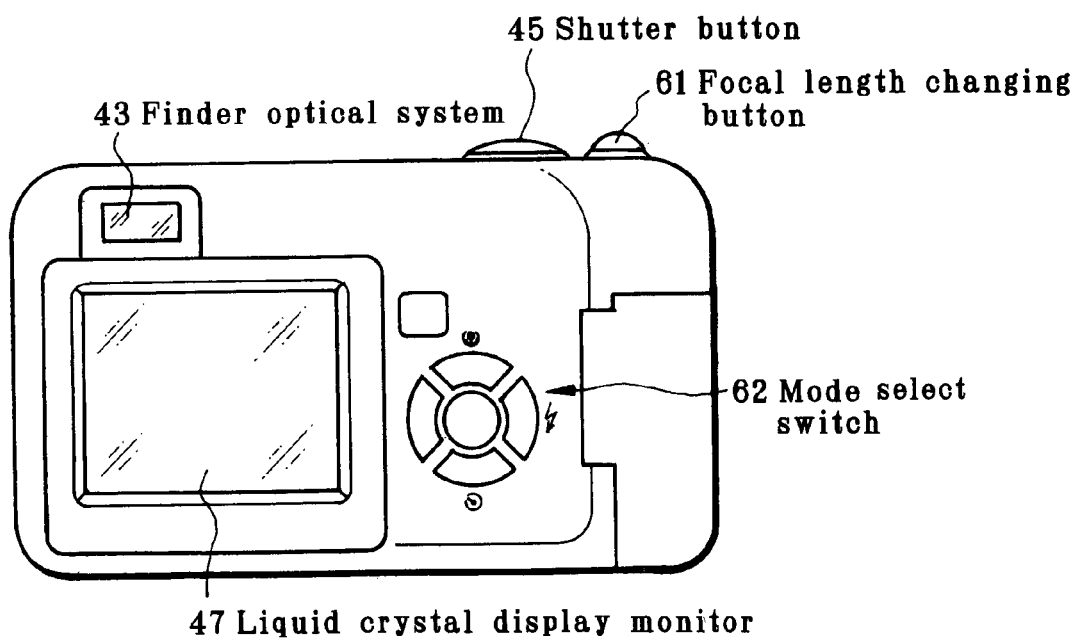
FIG. 17 is a rear perspective view of the digital camera of FIG. 16.
Figure 18:
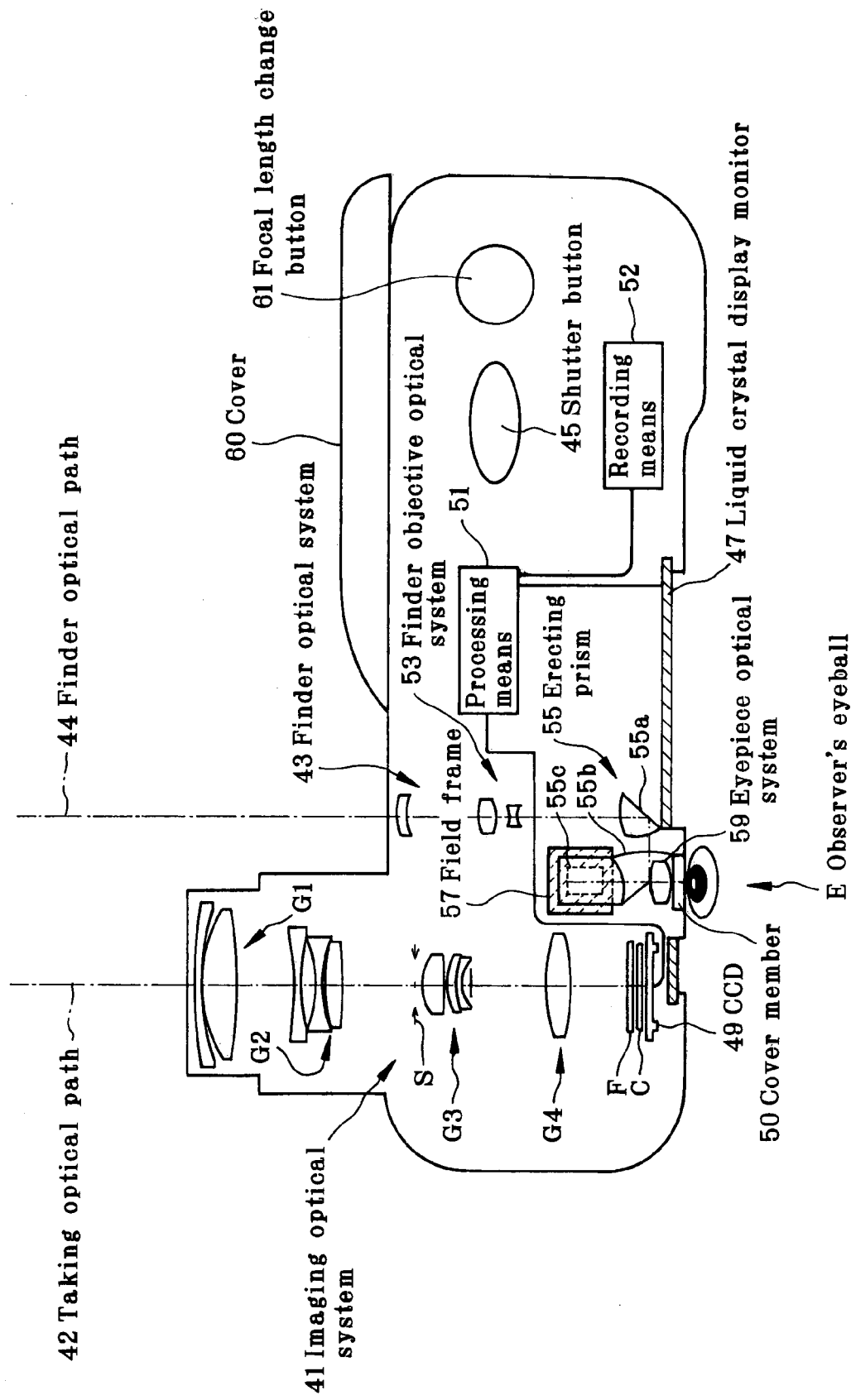
FIG. 18 is a sectional view of the digital camera of FIG. 16.

FIGS. 16, 17 and 18 are conceptual illustrations of a taking optical system 41 for digital cameras, in which the zoom optical system (zoom lens) of the invention is incorporated. FIG. 16 is a front perspective view of the appearance of a digital camera 40; FIG. 17 is a rear perspective view of the same; and FIG. 18 is a schematic sectional view of the setup of the digital camera 40. However, FIGS. 16 and 18 show the taking optical system 41 in operation. In this embodiment, the digital camera 40 comprises a taking optical system 41 positioned on a taking optical path 42, a finder optical system 43 positioned one a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is extended out, as in FIG. 18. As the shutter 45 mounted on the upper portion of the camera 40 is pressed down, it causes an image to be taken through the taking optical system 41, for instance, the zoom optical system of Example 1. An object image formed by the taking optical system 41 is formed on the imaging plane (photoelectric plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 16-18) and an erecting prism system 55 composed of erecting prisms 55*a*, 55*b* and 55*c*, and whose focal length varies in association with the zoom optical system that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 19:
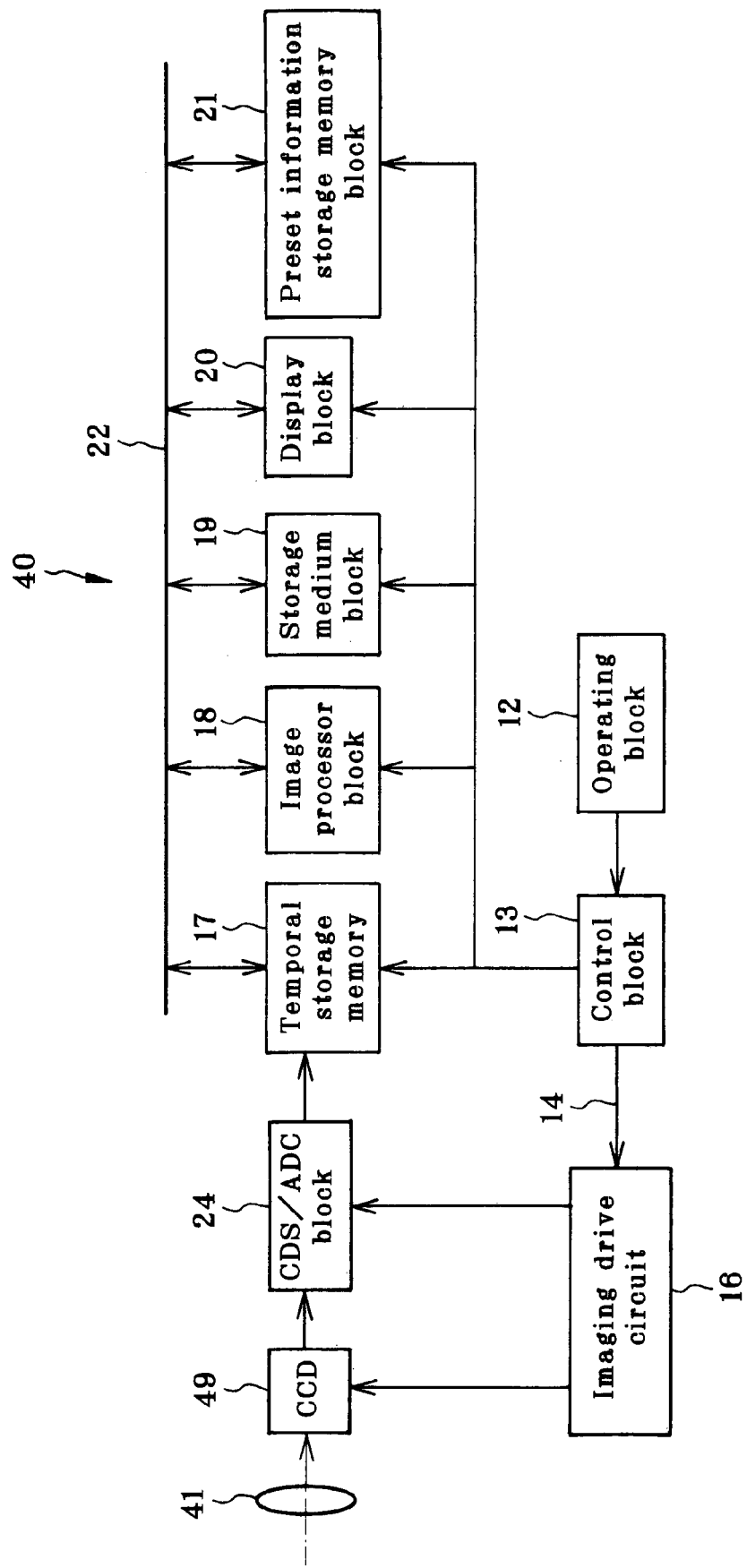
FIG. 19 is a block diagram illustrative of the construction of internal circuits in part of the digital camera of FIG. 16.

FIG. 19 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 19, the digital camera 40 is built up of an operating block 12, a control block 13 connected to the operating block 12 and an imaging drive circuit 16 connected to the control signal output port of the control block 13 via buses 14 and 15 as well as a temporal storage memory 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via bus 21, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a control that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom zones, albeit having a sufficient wide-angle are and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

I claim:

1. A zoom optical system comprising, in order from its object side, a positive first lens group, a negative second lens group, a positive third lens group and a positive fourth lens group wherein upon zooming from a wide-angle end to a telephoto end, the second lens group moves in such a way as to lie more on an image plane side at the telephoto end than at the wide-angle end and the third lens group moves, characterized in that a lens component $L_{21}$ having negative refracting power is located in, and nearest to the object side of, the second lens group, and satisfies the following conditions:

$$-1.0 < (R_{21f} + R_{21r})/(R_{21f} - R_{21r}) < 0.1 \tag{1}$$

$$1.5 < FL_{21}/F_2 < 6.0 \tag{2}$$

where $R_{21f}$ is a paraxial radius of curvature on an object side of the lens component $L_{21}$ having negative refracting power,
$R_{21r}$ is a paraxial radius of curvature on an imaging plane side of the lens component $L_{21}$ having negative refracting power,
$F_2$ is a focal length of the whole second lens group, and
$FL_{21}$ is a focal length of the lens component $L_{21}$ having negative refracting power.

2. The zoom optical system according to claim 1, characterized in that a surface of a vitreous material of at least one surface of said lens component L21 having negative refracting power or a surface thereof which a thin resin applied on it is subjected to aspheric processing.

3. The zoom optical system according to claim 1, characterized in that said negative second lens group comprises, in order from its object side, a lens component $L_{21}$ having negative refracting power, a lens component $L_{22}$ having negative refracting power and a lens component $L_{23}$ having positive refracting power.

4. The zoom optical system according to claim 3, characterized in that said lens component $L_{21}$ having negative refracting power, and said lens component $L_{22}$ having negative refracting power satisfies the following condition:

$$1.8<FL_{21}/FL_{22}<3.0 \qquad (6)$$

where $FL_{21}$ is a focal length of the lens component $L_{21}$ having negative refracting power, and $FL_{22}$ is a focal length of the lens component $L_{22}$ having negative refracting power.

5. The zoom optical system according to claim 3, characterized in that said lens component $L_{23}$ that is located in said second lens group and has positive refracting power satisfies the following condition:

$$-1.2<(R_{23f}+R_{23r})/(R_{23f}-R_{23r})<0 \qquad (8)$$

where $R_{23f}$ is a paraxial radius of curvature on an object side of the lens component $L_{23}$ having positive refracting power, and $R_{23r}$ is a paraxial radius of curvature on an imaging plane side of the lens component $L_{23}$ having positive refracting power.

6. The zoom optical system according to claim 1, characterized in that said third lens group moves in unison with an aperture stop.

7. The zoom optical system according to claim 1, characterized in that focusing is implemented with the positive fourth lens group and the following condition is satisfied:

$$0.6<MG_{t4}<0.85 \qquad (7)$$

where $MG_{t4}$ is a transverse magnification of the fourth lens group at the telephoto end.

8. The zoom optical system according to claim 7, characterized in that said positive fourth lens group comprises a single lens having an aspheric surface formed of a plastic material.

9. The zoom optical system according to claim 1, characterized in that said lens component $L_{21}$ that is located in, and nearest to an object side of, said second lens group and has negative refracting power is formed of a plastic material and has an aspheric surface.

10. An imaging apparatus, characterized by comprising a zoom optical system as recited in claim 1 and an imaging device that is located on an image side of said zoom optical system to convert an optical image into an electric signal.

11. The imaging apparatus according to claim 10, characterized in that a low-pass filter is located between said zoom optical system and said imaging device.

* * * * *